United States Patent [19]

Lane, Jr.

[11] Patent Number: 5,512,883

[45] Date of Patent: Apr. 30, 1996

[54] METHOD AND DEVICE FOR MONITORING THE OPERATION OF A MOTOR

[76] Inventor: William E. Lane, Jr., 458 Emerson Dr., Lexington, Ky. 40505

[21] Appl. No.: 428,508

[22] Filed: Apr. 25, 1995

Related U.S. Application Data

[63] Continuation of Ser. No. 282,091, Jul. 5, 1994, abandoned, which is a continuation of Ser. No. 970,659, Nov. 3, 1992, abandoned.

[51] Int. Cl.⁶ ................................................. G08B 21/00
[52] U.S. Cl. .............................. 340/648; 361/31; 361/93; 364/480; 364/483
[58] Field of Search ............................. 340/648; 361/31, 361/93, 96, 97; 364/480, 481, 483

[56] References Cited

U.S. PATENT DOCUMENTS

| | | | |
|---|---|---|---|
| 3,242,475 | 3/1966 | Davis | 340/248 |
| 3,809,985 | 5/1974 | Krause et al. | 318/490 |
| 3,840,780 | 10/1974 | Sons | 317/13 |
| 3,875,464 | 4/1975 | Gary et al. | 317/13 |
| 3,934,239 | 1/1976 | Mason et al. | 340/248 |
| 4,010,457 | 3/1977 | Simpson | 340/253 |
| 4,021,700 | 5/1977 | Ellis-Anwyl | 361/31 |
| 4,057,842 | 11/1977 | Bauman et al. | 361/93 |
| 4,286,303 | 8/1981 | Gonheimer et al. | 361/31 |
| 4,291,355 | 9/1981 | Dinger | 361/31 |
| 4,541,029 | 9/1985 | Ohyama | 361/31 |
| 4,568,996 | 2/1986 | McElhenny | 361/31 |
| 4,647,825 | 3/1987 | Profio et al. | 318/395 |
| 4,710,845 | 12/1987 | Demeyer | 361/96 |
| 4,767,280 | 8/1988 | Markusan et al. | 340/468 |
| 4,864,287 | 9/1989 | Kierstead | 340/648 |
| 4,967,304 | 10/1990 | Dougherty | 361/31 |
| 4,979,069 | 12/1990 | Simpson | 361/31 |
| 4,998,097 | 3/1991 | Noth | 340/648 |
| 5,255,148 | 10/1993 | Yeh | 361/93 |

Primary Examiner—John K. Peng
Assistant Examiner—Edward Lefkowitz
Attorney, Agent, or Firm—Kenyon & Kenyon

[57] ABSTRACT

In a method and device for monitoring the operation of a motor, the current drawn by the motor is sensed a preselected time after a peak of current is sensed. This sensed current is then compared to both a minimum and a maximum current threshold value to determine whether the sensed current is inside or outside the range of currents defined by the minimum and maximum current threshold values. The minimum and/or maximum current threshold values are dynamically adjusted as a function of the comparison.

11 Claims, 17 Drawing Sheets

METHOD AND DEVICE FOR MONITORING THE OPERATION OF A MOTOR

This is a continuation of application Ser. No. 08/282,091 filed Jul. 5, 1994, now abandoned, which is a continuation of application Ser. No. 07/970,659 filed Nov. 3, 1992, now abandoned.

FIELD OF THE INVENTION

The present invention relates to a method and device for monitoring the operation of a motor, and in particular to a method and device for monitoring the operation of a motor based upon the current drawn by the motor.

BACKGROUND OF THE INVENTION

The current drawn by a motor is indicative of the operating condition of the motor. If the motor draws too little current, the power generated by the motor may be insufficient to operate an apparatus in which the motor is installed, for example, to cool the air inside a refrigerator. If, on the other hand, the motor draws too much current, the high level of current may cause excessive wear on the motor, reducing the life span of the apparatus, or even cause immediate damage to the motor.

Monitoring devices have been utilized with motors in order to sense the current drawn by the motor over a period of time and to respond to malfunctions detected in the motor based on the current sensed. In particular, some conventional monitoring devices compare the sensed current to a fixed threshold value in order to detect situations in which the motor is drawing too little current or too much current.

SUMMARY OF THE INVENTION

The present invention provides a method and device for monitoring the operation of a motor. The monitoring device according to the present invention is coupled to a motor to sense the current drawn by the motor over a predetermined period of time. The "stabilized" current, i.e., the current level after a current peak occurs, is sensed and then compared to both a minimum and a maximum current threshold value in order to determine whether the sensed current has a value contained inside or outside the range of currents defined by the minimum and maximum current threshold values.

An autoprogramming feature according to the present invention provides for tracking of the current by dynamically changing the minimum and maximum current threshold values, to dynamically update the range of currents. The threshold values are changed as a function of the sensed current at a preselected time, and in particular when the sensed current is inside the range but closer to either the present minimum or maximum threshold value.

In an embodiment of the present invention, the device counts the number of times that the current is sensed outside of the present range during a preselected period of time. If a given number is exceeded, the device responds by triggering an alarm so that the malfunction can be recognized, diagnosed and corrected, and/or by shutting-off the motor in order to prevent harm to the motor.

In another embodiment of the present invention, the device measures the amount of time during which the current is sensed outside of the normal range. If this time exceeds a preselected period of time, the device likewise responds to indicate the presence of a fault.

An embodiment of the method according to the present invention includes the steps of sensing a current drawn by the motor at a preselected time after a current peak has been sensed; comparing the sensed current to a preselected minimum and maximum current threshold value; and adjusting at least one of the minimum and maximum current threshold values as a function of the comparison.

The method and device according to the present invention provide for both a quicker and more extensive detection of faults in a motor.

DETAILED DESCRIPTION

Figure 1:
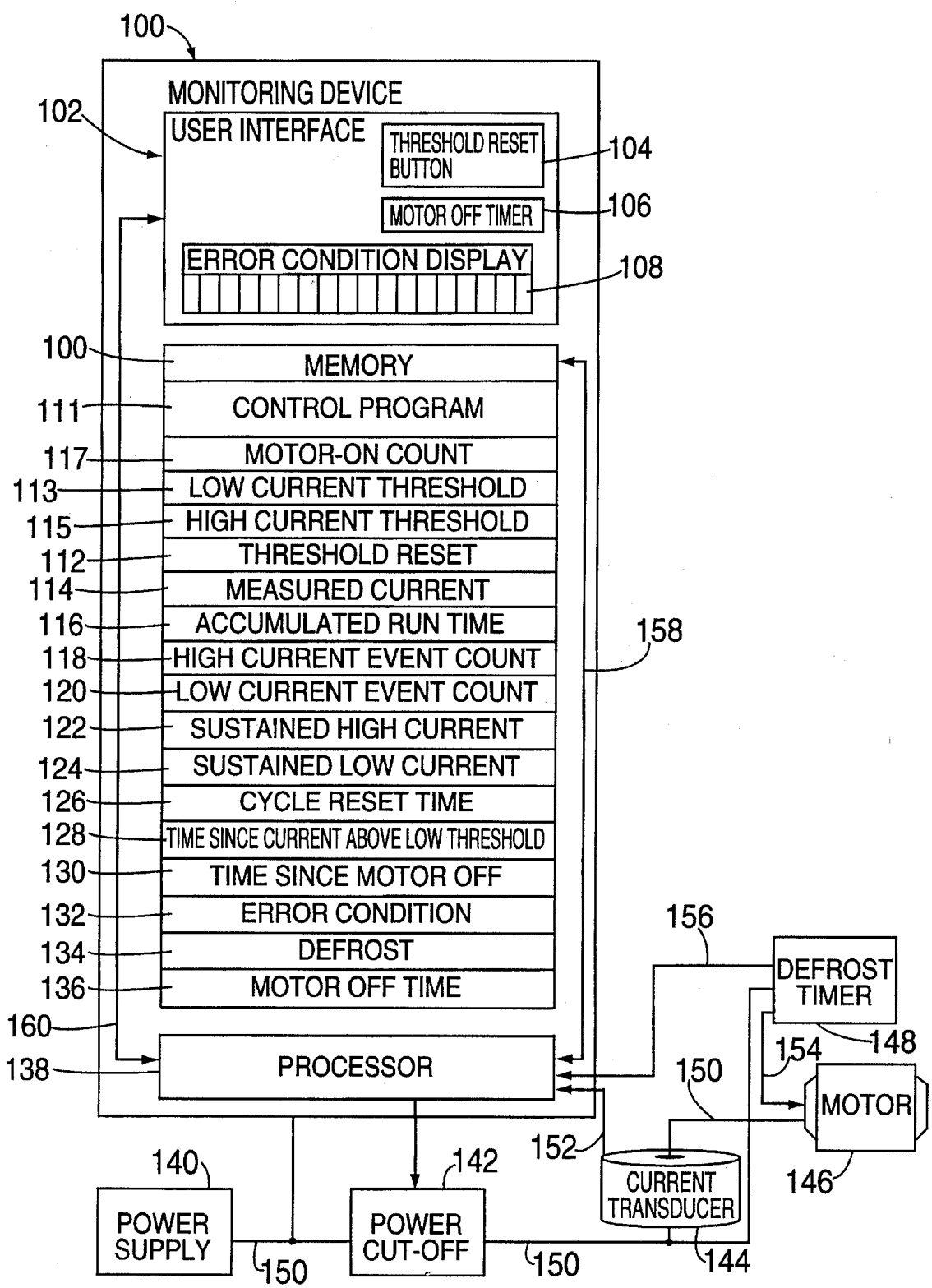
FIG. 1 shows a functional block diagram of an embodiment of the monitoring device of the present invention.

FIG. 1 shows a functional block diagram which illustrates the interrelationship among the components of an embodiment of the monitoring device according to the present invention, and, in particular, a monitoring device for a refrigeration unit compressor motor.

All functional elements of the system shown in FIG. 1 are electrically powered. The power to these elements is provided by power supply 140. This power supply can be of any type or phase sufficient to supply the components with power. In an embodiment of the monitoring device according to the present invention, the power supply is three-phased. The electrical power provided by power supply 140 directs electrical current to monitoring device 100, motor 146 and defrost timer 156 by way of power line 150. The flow of electricity to motor 146 and defrost timer 148 may be interrupted by power cut-off 142 at the direction of monitoring device 100 in the event of a motor error condition, which is discussed at length below.

As noted above, the monitoring device of the present invention may be applied to a motor under any form of electrical power. A current transducer 144, which could be an ammeter, for example, is placed on power line 150. If power line 150 were, in one embodiment, carrying three-phased electrical power, the current transducer 144 would measure the current off a single leg of power line 150. The current measurement transduced by current transducer 144 is available to monitoring device 100 by way of line 152, which carries the measured current into monitoring device 100 and particularly to processor 138 of monitoring device 100.

As shown in FIG. 1, defrost timer 148 may furnish motor 146 with a signal over line 154 in order to temporarily disable it so that, in one embodiment, the temperature in a refrigerated space may be permitted to warm up and melt accumulated frost. In a like embodiment, the state of defrost timer 148 may also be read by monitoring device 100, in particular by processor 138, by way of line 156. Having sensed the state of defrost timer 148, processor 138 of monitoring device 100 may accommodate its motor monitoring task accordingly.

An embodiment of the monitoring device 100 includes, for example, a processor 138, a memory 110 and a user interface 102. Processor 138, which may be implemented by a dedicated or general purpose processor known to those skilled in the art, reads control program 111 from memory 100 and carries out the instructions of the control program 111, one embodiment of which will be discussed at length below under the heading FLOW OF CONTROL. Processor 138 is capable of cycling rapidly through the steps of control program 111 and accepting as input, at a commensurate rate, some or all of the following data: from line 152 the transduced current measurement generated by current transducer 144; from line 156 the state of the defrost timer 148; from bidirectional line 158 any data stored in memory 110; and from bidirectional line 160 any output of user interface 102, including but not limited to the state of threshold reset button 104. In an embodiment of the monitoring device according to the present invention, processor 138 cycles through control program 111 60 times per second while reading data from each of the above-mentioned input lines at least once per cycle.

Similarly, during its execution of each cycle of the control program 111, processor 138 can read from and write to, for example, the following memory locations via bidirectional line 158: threshold reset 112, measured current 114, accumulated run time 116, high current event 118, low current event 120, sustained high current 122, sustained low current 124, cycle reset time 126, time since current above low threshold 128, time since motor off 130, error condition 132, defrost 134 and motor off time 136. Processor 138 can also write to user interface 102 via bidirectional line 160 an error code for display in error condition display 108.

As shown in FIG. 1, memory 110 of monitoring device 100 represents a general memory device capable of both long and short term memory tasks. As discussed in the context of processor 138, the memory stores in its various memory locations the control program 111 and a number of additional data. Over bidirectional line 158, the contents of the memory location may either be read or written by processor 138.

User interface 102 of monitoring device 100 may receive data from or furnish data to processor 138 via bidirectional line 160. As shown in FIG. 1, user interface 102 contains optionally three components: (1) a threshold reset button 104, for permitting a user of the monitoring device to restore to the low current threshold memory location 113 and the high current threshold memory location 115 any default settings associated with those variables; (2) a motor-off timer 106, for permitting a user to specify a maximum time the monitoring device should permit the motor to turn off before indicating an error condition; and (3) a visual and/or auditory error condition display 108 for communicating to the user one or more of a number of detected fault conditions.

FLOW OF CONTROL

A flowchart illustrating the flow of control in the monitoring device of the present invention is illustrated in FIGS. 2A through 2E. The control operations of the monitoring device, which are illustrated in those Figures and described below, can be implemented on any dedicated or general purpose processor. In monitoring the current load on an electric motor, the monitoring device control flow loop shown in FIGS. 2A through 2E may be executed at any rate appropriate for the context of the particular monitoring task. In situation in which a refrigerator compressor motor is monitored, for example, a control flow loop cycle time of 60 times per second may be appropriate.

Figure 2A:
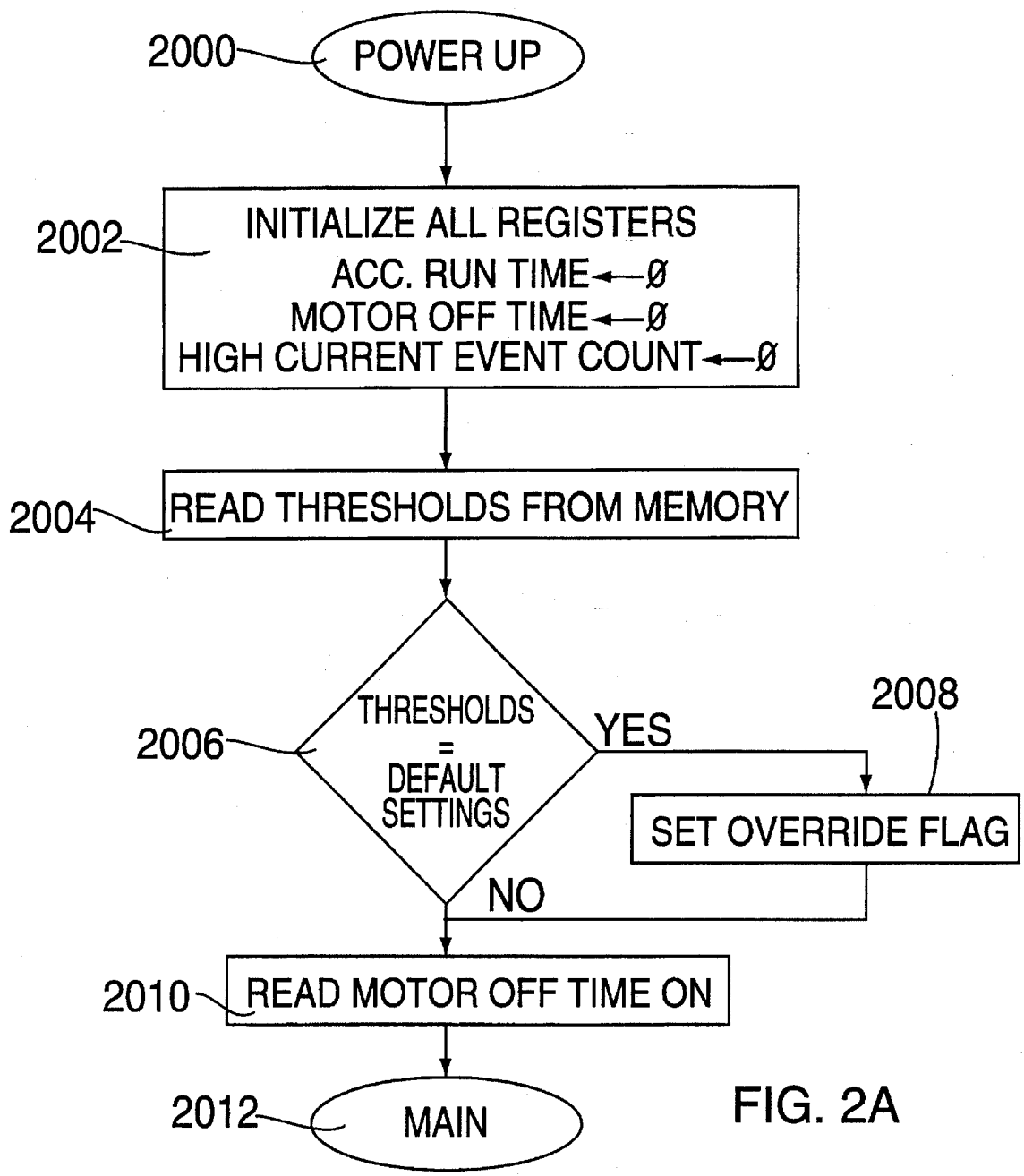
FIGS. 2A through 2E show the elements of a flowchart illustrating the flow of control in an embodiment of the monitoring device of the present invention.

Referring first to FIG. 2A, the operation of the monitoring device begins at power up 2000. All registers are initialized at step 2002, i.e., the accumulated run time 6 stored at memory location 116, the motor off time stored at memory location 136 and the high current event 5 count stored at memory location 118 are all set to zero. The high and low current thresholds are read at step 2004 from memory locations 115 and 113, respectively. These thresholds are initially set to a default value in a moderate range and are later updated as the loading conditions on the motor vary.

When the measured current to the motor exceeds the high current threshold, the current is treated as being high or out of bounds. The current is low when it falls beneath the low current threshold. Between the high and low thresholds, the current is in a normal range. After being read from memory at step 2004, the thresholds are then checked in step 2006 as to whether they equal the prespecified default settings. If the current thresholds do equal the factory settings, step 2008 is called, which sets an override flag. This override flag, which is also set when the thresholds are manually reset to their default values, is designed to avoid an incorrect detection of a high current condition when the default thresholds are too low for a particular motor. If the current thresholds do not equal the factory settings at step 2006, or if the override flag has been set at step 2008, the motor-off time is read at step 2010 from the manual switch 106 located on user interface 102, as shown in FIG. 1.

Figure 2B:
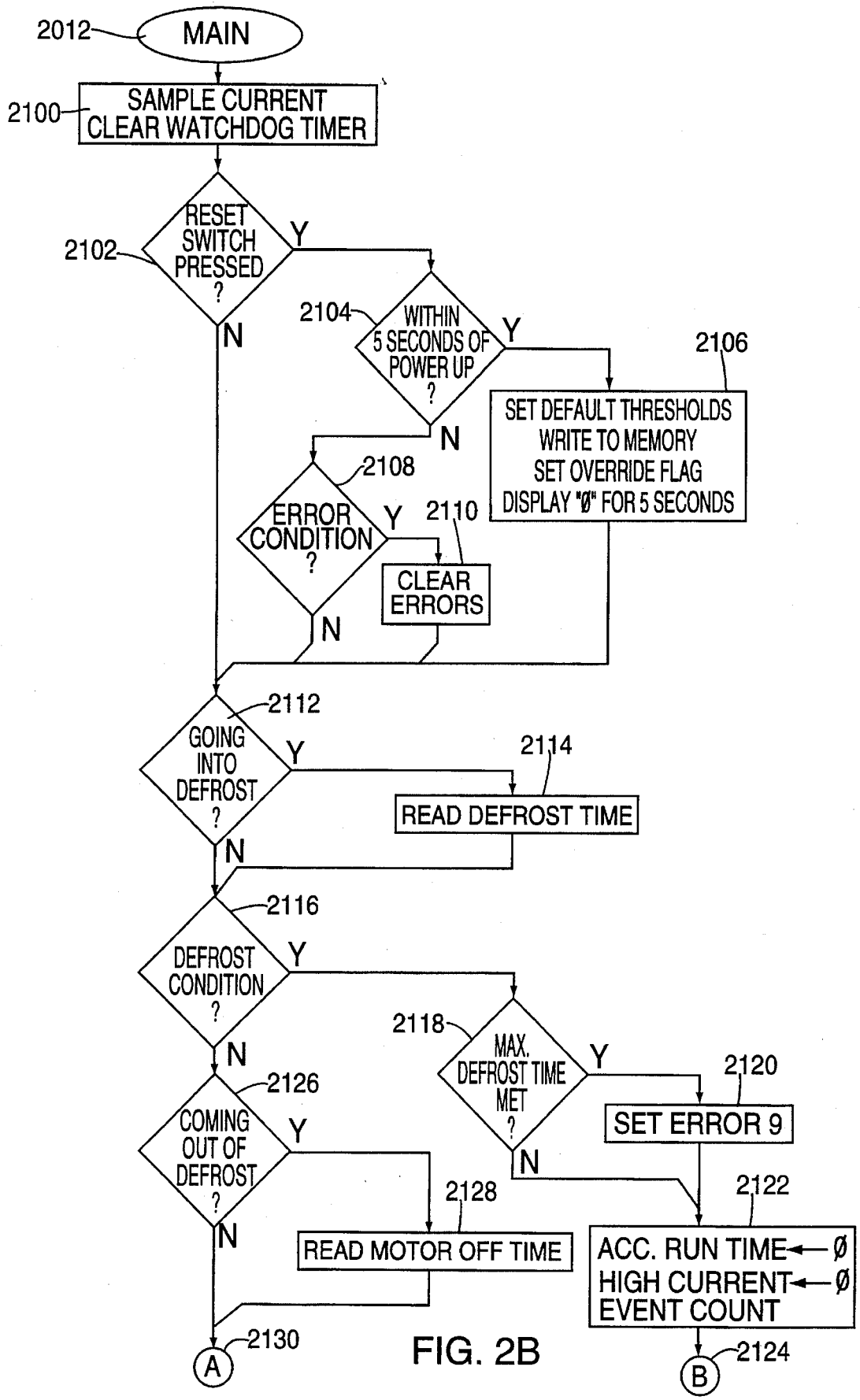

The monitoring device flow of control now enters the main module 2012. Referring to FIG. 2B, once the monitoring device is in this module at step 2100, it samples the current and clears the watchdog timer. The watchdog timer is incremented each time a loop is completed. When the main module is called, the watchdog timer is reset to zero. If the watchdog count becomes relatively high, this means the main program has not been entered, indicating the occurrence of some fault. If this occurs, the monitoring device can re-start itself.

At step 2102, the monitoring device checks the manual reset switch circuit 104, shown in FIG. 1, to determine whether it has been pressed. If it has, the monitoring device tests, at step 2104, whether the pressing of the reset switch occurred within five seconds of system power up 2000. If so, at step 2106, the monitoring device resets the current thresholds to the factory default settings and writes them to memory. The monitoring device then sets the override flag active and displays "0" for five seconds on error condition display 108 (shown in FIG. 1). If the manual reset button is pressed after five seconds from system power up 2000, the monitoring device at step 2108 checks for the presence of an error condition. If an error condition is detected, the error condition memory location 132, in FIG. 1, is cleared at step 2110. If not, or if the manual reset switch had not been pressed, the monitoring device proceeds to step 2112.

While the present invention is directed to the control of electric motors in general, steps 2112 through 2128 represent control logic which is specific to the context of controlling compressor motors in refrigeration units. In particular, at step 2112 the monitoring device checks to determine whether the refrigerator is going into a defrost cycle. If it is, the defrost time is read at step 2114. At step 2116, the monitoring device checks whether a defrost condition has been entered. If a defrost condition has been entered, the monitoring device, at step 2118, tests whether the maximum defrost time has been met. If that time has been met, the monitoring device, at step 2120, sets the error condition to 9, indicating that the compressor motor has not restarted following a regularly scheduled defrost period.

Whether or not the maximum defrost time has been met, the control of the monitoring device proceeds to step 2122, where it resets to zero the accumulated run time stored at memory location 116 and the high current event count stored at memory location 118. The control of the monitoring device proceeds to connecting point B, at step 2124, which transfers the flow of control to the flowchart shown in FIG. 2D.

If, at step 2116, the monitoring device determined that the system is not in a defrost condition, it then checks, at step 2126, whether the system was coming out of a defrost condition. If so, the monitoring device would read the motor-off time at step 2128. Whether or not the monitoring device had determined, at step 2126, that the system was not coming out of a defrost cycle, the flow of control proceeds to connecting point A, at step 2130, which transfers the flow of control to the flowchart shown in FIG. 2C.

Figure 2C:
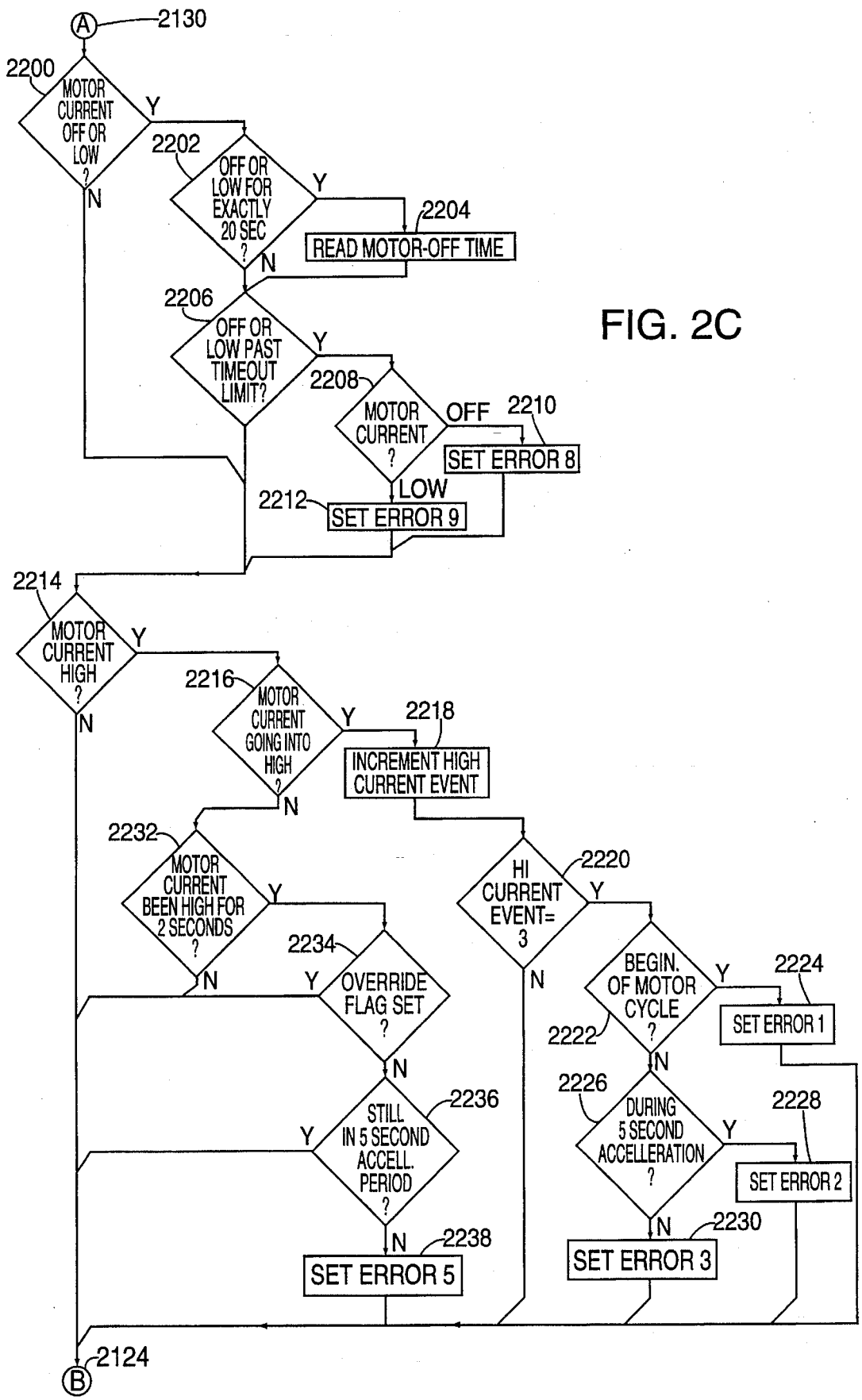

As shown in FIG. 2C, the monitoring device tests, at step 2200, whether the measured motor current is low (e.g., less than or equal to 2.5 amperes) or off (i.e., zero amperes). If the measured current is low or off, the monitoring device determines, at step 2202, whether the current has been low for 20 seconds. This period is free to vary with the application to which the monitor device is put; in the present embodiment, 20 seconds has been chosen for purposes of illustration. If the current has been low for 20 seconds, the monitoring device reads the motor-off time, which may be varied, depending upon the embodiment. In the present embodiment, this time period is preselected and manually entered by the user.

At step 2206, which is reached if the measured current is off (i.e., zero), or low (below the low current threshold), the monitoring device tests whether the current has been off or low for an unacceptably long period of time, referred to as the timeout limit. If it has, the monitoring device, at step 2208, tests whether the measured current is low or off. If the current is off, the monitoring device sets error condition 8, which indicates that the compressor motor has not restarted within an acceptable period. If the measured current is merely low, error condition 9 is set, indicating that the compressor motor has not restarted following a regularly scheduled defrost period.

The monitoring device next checks, at step 2214, whether the measured current is high (i.e., above the high current threshold). If this test reveals that the current is high, the monitoring device determines, at step 2216, whether the measured current is climbing into the high current range. If the measured current is indeed climbing into the high current range, the monitoring device registers a high current event. The monitoring device then proceeds to test, at step 2218, whether the number of high current events has reached three. This value is used as an example only, and can instead be set higher or lower depending upon the characteristics of the system with which the monitoring device is to be used. If the third high current event occurs, the monitoring device checks at step 2222 whether the compressor motor is at the beginning of a cycle. If a cycle has just begun, the monitoring device sets error condition 1, at step 2224, indicating that the compressor has cycled too often within a predetermined period of time. If the compressor motor has not just begun a cycle, the monitoring device checks at step 2226 whether the third high current event has occurred within the motor's acceleration period of, for example, five seconds. If it has, error condition 2 is set, which indicates that a repeatedly high current draw has occurred during the start or stabilizing period of the compressor motor. If the third high current condition has occurred after the motor acceleration period, the monitoring device, at step 2230, sets the error condition to 3, indicating that a repeatedly high current has occurred during the run portion of the cycle. If the compressor motor current was found, at step 2214, not to be high, then it is in the normal range. The control flow of the monitoring device proceeds to connecting point B, at step 2124, which connects with the flow chart shown in FIG. 2D.

Figure 2D:
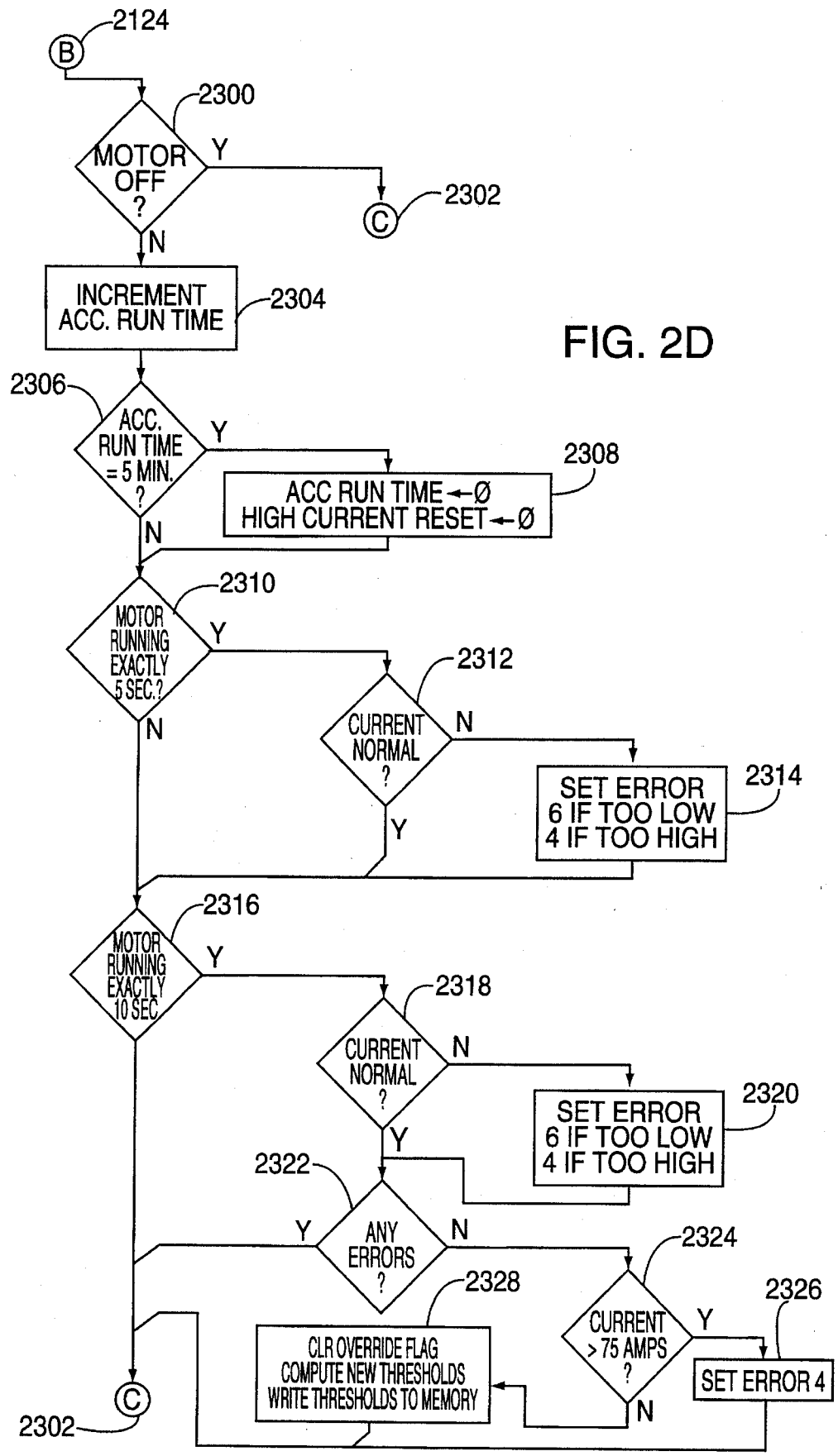

In FIG. 2D, the monitoring device checks at step 2300 whether the compressor motor is off, i.e., whether its current at zero. If so, the control flow of the monitoring device proceeds to connecting point C, at step 2302, which connects to the flowchart shown in FIG. 2E. If, however, the monitoring device determines that the motor is not off, it proceeds to increment the accumulated run time at step 2304. Then, the monitoring device tests, at step 2306, whether the accumulated run time equals five minutes, the cycle reset period in the present example. If the accumulated run time has reached five minutes, the monitoring device, at step 2308, resets the accumulated run time at memory location 116 and the high current event count at memory location 118.

The monitoring device next ascertains, at step 2310, whether the motor has been running for exactly five seconds. If so, it tests, at step 2312, whether the measured current is in the normal range. If the monitoring device finds that the current has deviated from the normal range, it proceeds to step 2314 and sets the error condition to 6, if the current is in the low range, or to 4, if the current is in the high range. Error condition 6 indicates that a loss of mechanical performance of the compressor or a loss of fixture load may have occurred during the start portion of the compressor motor cycle. Error condition 4 warns the operator that a sustained high current draw has occurred during the start or stabilization period of the cycle.

The monitoring device next determines at step 2316 whether the motor has been running for ten seconds. If it has, the monitoring device checks, at step 2318, whether the current is in the normal range. If the current is outside of the normal range, the monitoring device at step 2320 sets the error condition to either 6 or 4. If the current was determined, at step 2318, to be within the normal range, the monitoring device inquires, at step 2322, as to whether any error condition has been set. If no error condition has been set, the monitoring device, at step 2324, tests the measured current to determine whether it exceeds a predetermined limit based on the motor current that is safe for the hardware components. In the refrigeration compressor motor context, the ceiling is set at 75 amperes. If the measured current exceeds the current ceiling, the monitoring device sets error condition 4, which signals the occurrence of a sustained high current draw during the start or stabilization period. If the measured current does not exceed 75 amperes, the monitoring device proceeds to step 2328, in which case the current has been twice sampled and found to be within the normal range. The present current measured, for example, at ten seconds from start-up is taken as the stabilized value of the current.

A normal cycle has thus occurred, during which the operating conditions of the motor may have migrated anywhere within the preset normal range. To adapt to any such normal change in the motor's operating condition, the monitoring device updates the high and low current thresholds as a function of the stabilized current and stores them in memory. In the embodiment of the present example, the updated high current threshold is set to 1.4 times the value of the stabilized current, while the low current threshold is set to 0.75 times the stabilized current value. These factors may be empirically determined. The appropriate value of these constants as a function of the stabilized current depend upon the particular application of the principles according to the present invention. Finally, the override flag is cleared. Once the monitoring device has completed these operations, it reaches connecting point C, at step 2302, which connects to the flowchart shown in FIG. 2E.

Figure 2E:
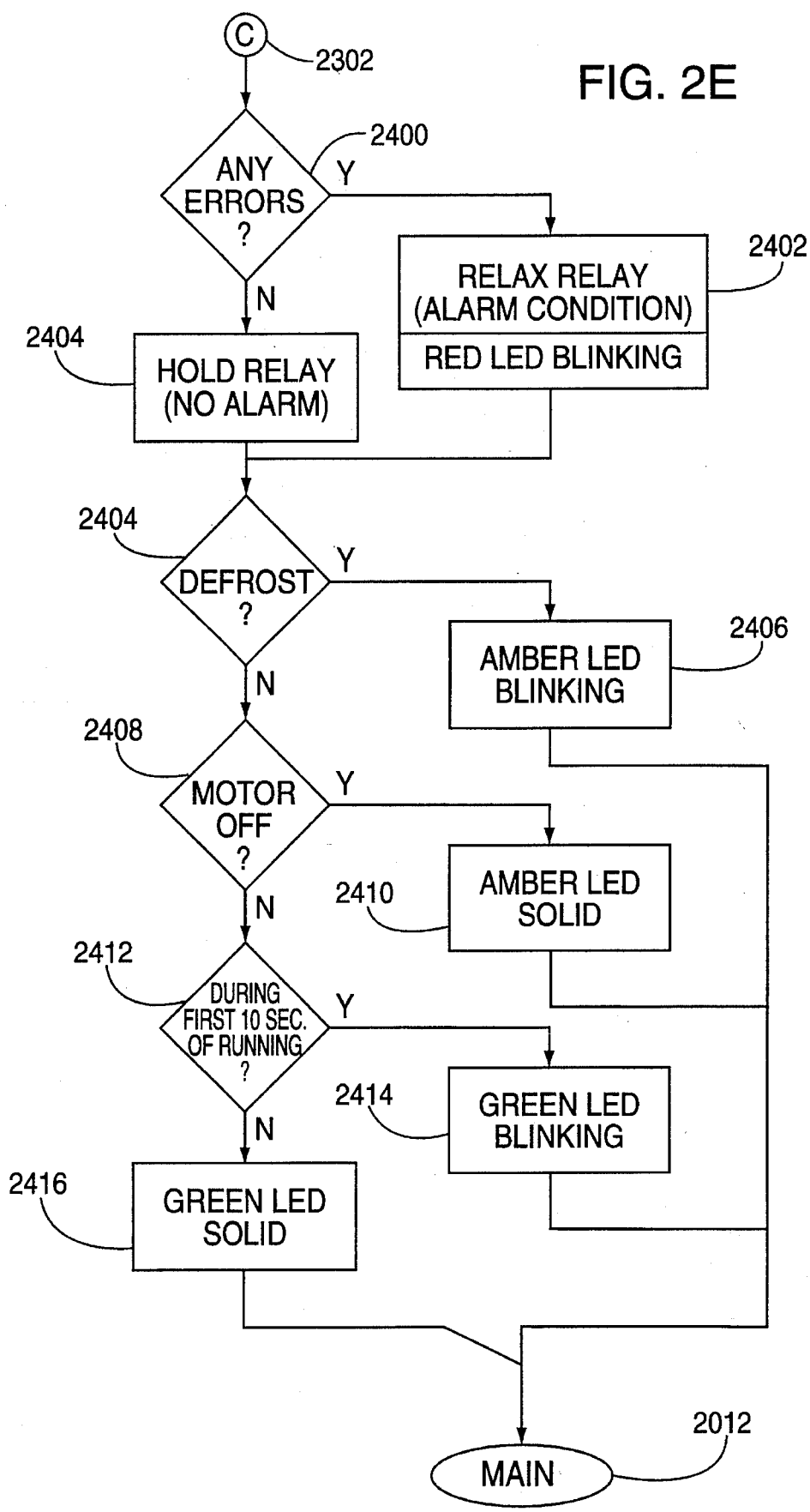

Referring to FIG. 2E, at step 2400, the monitoring device of the present invention checks to determine whether an error condition has thus far been set. If so, the monitoring device activates the appropriate audio or visual alarm signal at the user interface or, optionally, disables the motor. Next, at step 2404, the monitoring device checks whether the refrigerator unit is in defrost mode, in which case, at step 2406, the appropriate signal is sent to the user interface. At step 2408, the monitoring device determines whether the compressor motor is off. If so, it activates, at step 2410, the appropriate signal at the user interface. If the motor is in the first ten seconds of operation, as determined in step 2412, the monitoring device detects this, at step 2412, and sends a signal to the user interface to indicate this fact. Otherwise, the motor is simply running, which condition is also displayed on the user interface. The monitoring device, at step 2012, returns to the main modules shown in FIG. 2B and described above.

OPERATION OF THE MONITORING DEVICE

FIGS. 3–13 depict high current events which may occur during a run cycle of the motor. To illustrate the operation of the monitoring device in each of FIGS. 3– 13, three variables are plotted as a function of time, one in each of plots (a), (b) and (c) of the Figures.

The first of these is the measured current 1, plot (a) in each of FIGS. 3–13. As shown in FIG. 1, measured current 1 is measured from line 150 connecting motor 146 to power supply 140. The range over which the measured current 1 may vary with time is shown by the current axis. A measured current 1 of zero, which indicates that the motor is off, is shown as a dashed line.

Also shown in plot (a) of each of FIGS. 3–13, with respect to the measured current 1, are two current thresholds 3 and 4 which represent the high current threshold and the low current threshold, respectively. The high current threshold 3 is a dynamically updated reference whose value is adjusted to reflect changing motor load conditions. The measured current 1 is compared with the high current threshold 3 to detect the presence of motor current overload. Similarly, the low current threshold 4 is a dynamically updated reference for the detection of motor current underload. When the motor is operating normally, the stabilized current 2 appears between each pair of current threshold segments 3 and 4.

In accordance with the present invention, the current thresholds 3 and 4 are adjusted during each normal cycle, in a manner described below, to accurately and predictively reflect the operating conditions of the motor so that current overload and underload are detected in a manner responsive to the present operating condition of the motor. When the stabilized current 2 is determined and the new high current threshold 3 and low current threshold 4 are computed as a function of the stabilized current 2, all three of these variables are shown as a solid line. These lines remain solid until the motor is powered down, at which time they once again are shown as dashed lines. The dashed line representation of high and low current thresholds 3 and 4, respectively, and stabilized current 2 thus may indicate levels arrived at in a previous cycle. In the case of the thresholds 3 and 4, the dashed lines may alternatively, for an initial cycle, indicate default settings for the thresholds.

The second plot (b) in each of FIGS. 3–13 shows the accumulated run time 6 of the motor 146, which is measured and stored by the monitoring device according to the present invention at memory location 116 as shown in FIG. 1. The accumulated run time signal 6 is high when the motor is running, where the measured current 1 is strictly positive. When the motor is off, i.e., when the measured current 1 is zero, the accumulated run time signal is shown as a dashed line in the low position. The total accumulated run time 6 is stored at memory location 116 for the purpose of determining how many run-time events occur within a certain time window, the terminus of each such window denoted in the Figures as cycle reset points 8. The period for cycle reset according to the present invention may vary with the application. If too many discrete starts and stops of a refrigerator compressor motor, for example, occur within a five minute period this may indicate a fault whose presence should trigger an alarm. When the preset time window cycle reset point 8 has been reached, the accumulated run time 6 is reset to zero at memory location 116. The accumulated run time 6 remains at zero until the occurrence of the next start up of the motor starts it again counting during periods of motor operation until the next cycle reset point 8.

The third plot (c) in FIGS. 3–13 illustrates the motor-on count 7. When a current pulse has not yet been detected, or when the counter is reset, the counter has a value of zero, denoted by a dashed line. When a rising edge of a current pulse has been detected, indicating that the motor 146 has been turned on, the counter begins to measure the time elapsed since the detection of the pulse. The active counting period is denoted by a solid line. Like the accumulated run time 6, the motor-on count 7 at memory location 117 is reset to zero upon reaching the end of the preset time window and remains at that value until the motor is again energized.

Included in the plots of measured current 1 and accumulated run time 6 are high current events 5. These points denote the current overload of the circuit that occurs when the measured current 1 exceeds the high current threshold 3. As with the motor-on count 7, the high current events 5 are counted during any given window of the accumulated run time 6 and are stored at memory location 118. The existence of repeatedly high currents may reveal the occurrence of a system fault.

NORMAL CYCLE

Figure 3:
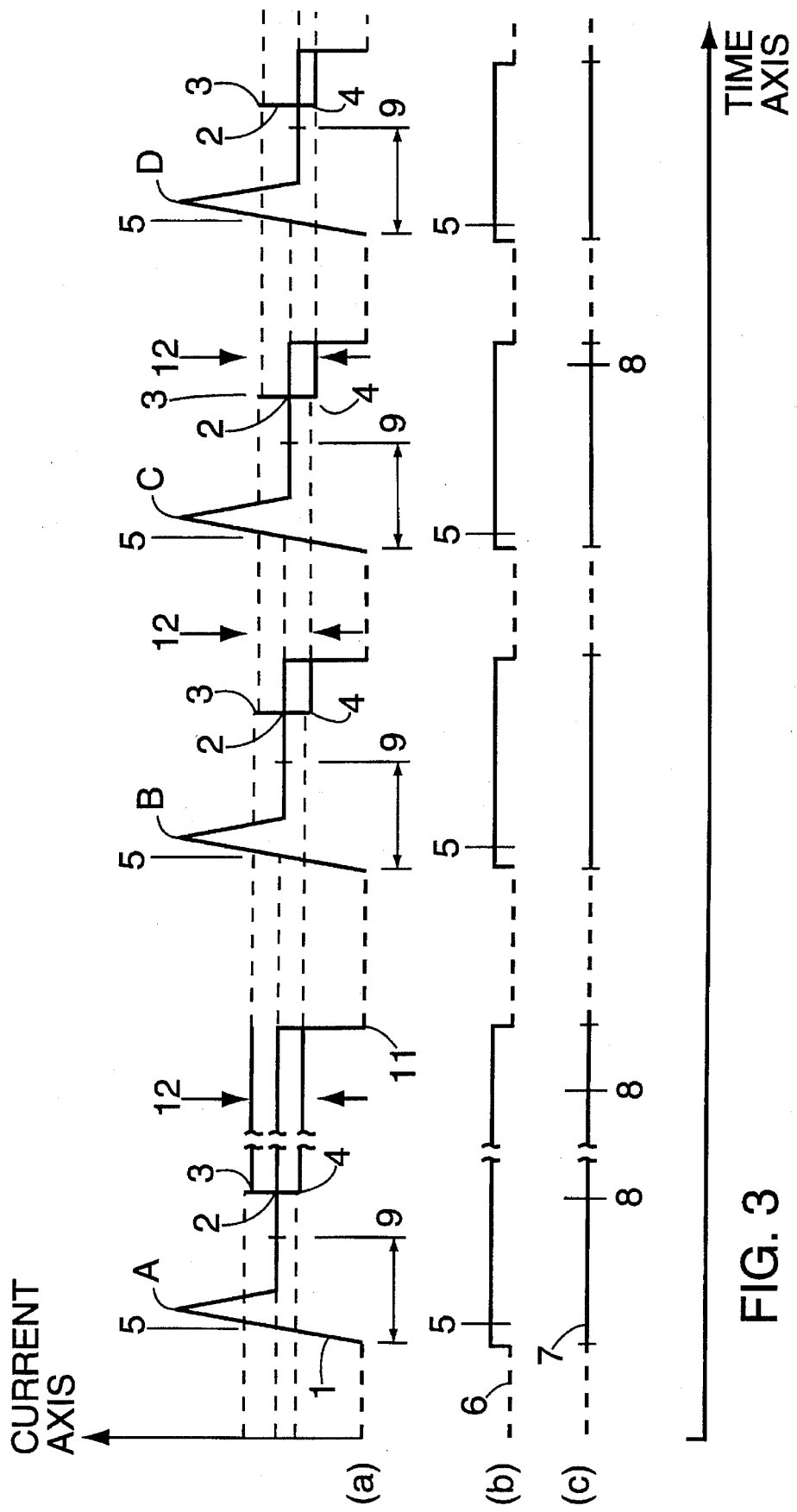
FIGS. 3(a)–(c) shows three plots of a cycle timing diagram which illustrate the operation of an embodiment of the monitoring device of the present invention under normal operating conditions.

FIG. 3 shows the behavior of the measured current 1 during normal operation of the motor. Four cycles A, B, C, and D are shown as regions of increased current amplitude, or peaks, each followed by a region of stabilization. Corresponding to each of the four current cycles in plot (a) is an active (signal high) region of the accumulated run time 6 in plot (b) and an active cycle counting period 7 in plot (c). The four regions, which each show a variant of a normal cycle of the motor, will be discussed in turn.

Cycle A illustrates start-up of the motor under normal conditions. Under the conditions depicted in the graph, the motor is required to be run continuously for an extended period of time at a relatively high rate of power consumption. This would be the case, referring to the example of the embodiment directed to a compressor motor in a refrigeration unit, where the refrigeration unit is being operated during the day, subject to higher usage levels and ambient temperatures. Until the motor is turned on, the measured current 1 is at zero. Also, at this time, the monitoring device according to the present invention has a high and low current threshold, respectively at 3 and 4, which are either at a default setting or are at the level set during the previous cycle. When the motor is powered up, the current and, thus, the measured current 1, begin to rise, as can be seen at the leading edge of the acceleration period 9. With the emergence of this rising edge of the current pulse, the accumulated run time signal 6 also rises. The rise of the accumulated run time signal 6 marks the start of the period during which the number of run events (e.g., current 1 measured outside of the normal range 12 defined by the values of the high and low current thresholds 3 and 4) are being counted. Thus, the cycle counting period 7 goes active, indicating that a run cycle event is being counted.

The measured current 1 rises past the low current threshold 4, the stabilized current 2 from the previous cycle, and the high current threshold 3. Upon the measured current 1 exceeding the high current threshold 3, a high current event 5 is detected and is registered by incrementing memory location 118. The measured current 1 then peaks and begins to fall. As indicated at the trailing edge of the acceleration period 9, current 1 stabilizes at a level slightly lower than that of the previous cycle. At this point, for example 10 seconds following power-up of the motor, a new stabilized current 2 is stored at the level value of the measured current 1. The processor 138 then computes new values for the high current threshold 3 and the low current threshold 4 as a function of the newly measured stabilized current 2. The values of the thresholds as functions of the stabilized current may be set according to the demands of the application.

In an embodiment of the monitoring device of the present invention, in which threshold scaling factors have been empirically arrived at for refrigeration application, the high current threshold 3 is set at 1.4 times the stabilized current 2 and the low current threshold 4 is set at 0.75 times the stabilized current 2. The cycle is presumed to continue in normal operation for some time and then the motor circuit is de-energized. Upon de-energizing the motor, the measured current 1 drops down to zero, as shown at 11. At this instant, the processor 138 detects this zero measured current value and ceases incrementing the accumulated run time 6. Additionally, the processor 138 completes the recording of an event count 7, which is now set at 1. However, as can be seen by referring to the cycle reset points 8 on plot (c) in FIG. 3, accumulated run time 6 has already been reset twice before the end of the first cycle of the motor. Such multiple resets of the accumulated run time 6 can occur during each cycle.

Cycles B, C and D are, like cycle A, representative of cycles of the motor under normal operation. Here, however, FIG. 3 depicts runs of the motor for shorter periods and at a lower rate of power consumption. Again referring to the embodiment of a compressor motor driving a refrigeration unit, this subset of the graph would describe the operation of the unit when usage levels and ambient temperatures are lower, for example, at night. In each of the three cycles of the motor depicted in this subset of the Figure, the start up current overload at the peaks occurring in cycles B, C and D is essentially identical to the overload at A. Each of the updated normal ranges 12 (bounded by the high and low current thresholds 3 and 4) for each of the three cycles is seen to be successively lower than that preceding it, the diminution corresponding to the lower demands placed on the motor under the assumed conditions. Accordingly, the high and low current thresholds, 3 and 4, respectively, are seen also to drop incrementally with each of the three cycles.

Meanwhile, in each instance, the monitoring device notes the power-up of the motor leading to each of the peaks in cycles B, C and D, whereupon it begins incrementing the accumulated run time 6, denoted in plot (b) as a high signal. When the measured current 1 crosses the new high current threshold 3, the monitoring device detects a high current event 5 and registers it by incrementing memory location 118, shown in FIG. 1. It can be seen that only the first two of these three overload events fall within the present cycle reset period 8, which terminates before the end of the cycle C. The occurrence of two such overloads within the cycle reset period could, if the monitoring device is so programmed, trigger an alarm or even shut off the motor by way of power cut-off 142 in FIG. 1. It can also be seen in FIG. 3 that only one complete cycle of the motor occurs before the accumulated run time 6 and the count of high current events 5 are cleared at the cycle reset 8.

CURRENT THRESHOLD ADJUSTMENT: POST DEFROST

In FIG. 4, three cycles are again shown. The first two of these cycles are normal, like those described above in connection with FIG. 1. The third cycle, which begins with the measured current 1 rising to the peak in cycle G, marks a higher than usual load condition. A high load condition of this sort might be associated, in the presently considered embodiment, with a refrigeration unit entering a post defrost period. After defrost, the motor runs at a higher than usual level to evacuate the heat whose introduction into the refrigerated space was necessary for defrosting purposes.

The ensuing higher current load can be seen for the third cycle G. After reaching a peak, the measured current 1 drops to a stabilized level which exceeds the stabilized current 2 level established in the second cycle F and which is only slightly below the high current threshold 3 of the second cycle F. As a result of the higher level of the measured current 1, the stabilized current 2 and the high and low current thresholds 3 and 4, respectively, are updated to commensurately higher levels.

Figure 4:
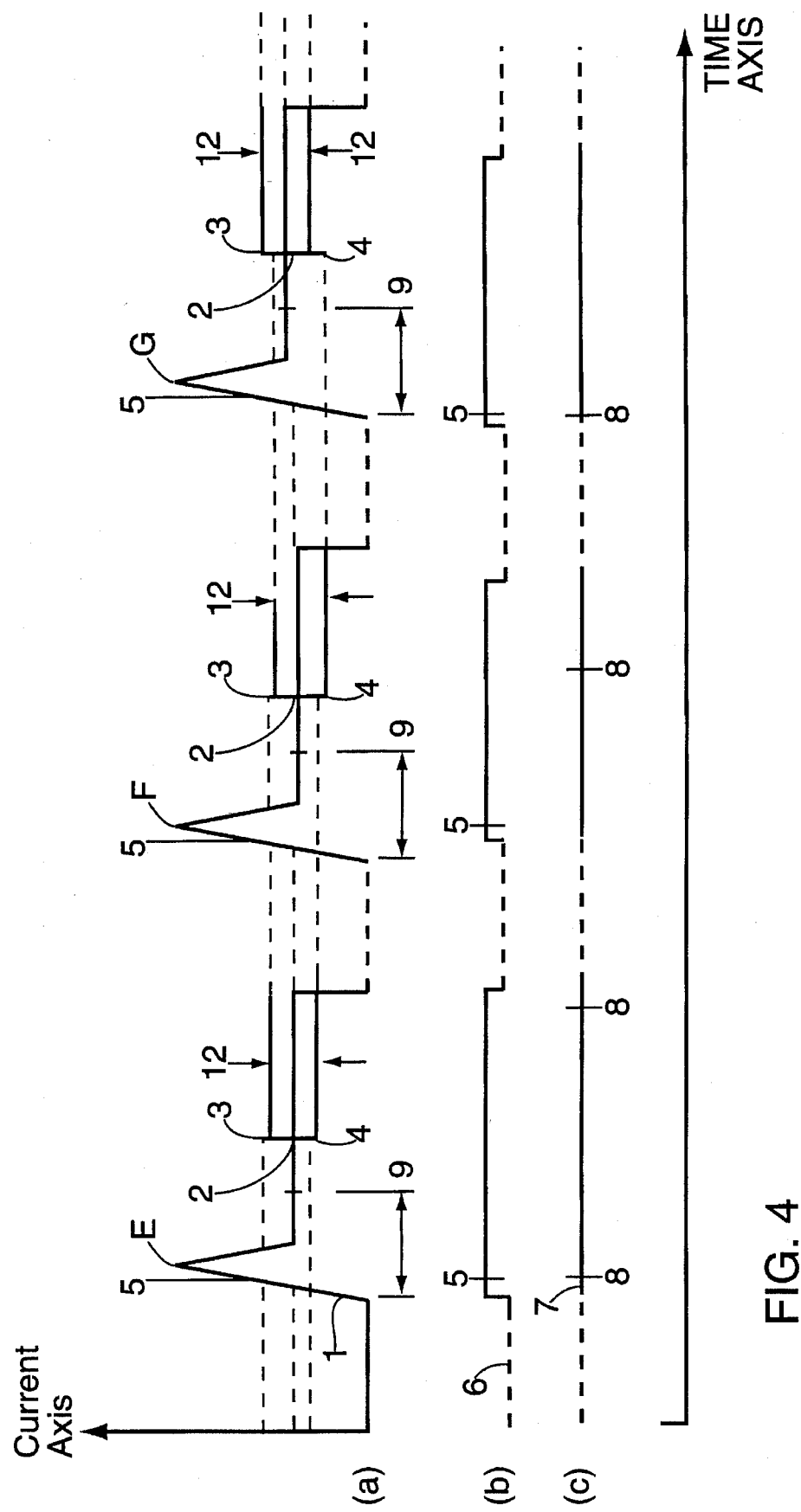
FIG. 4(a)–(c) shows three plots of a cycle timing diagram which illustrate the dynamic adjustment of the current thresholds and the operation of the monitoring device under a post-defrost condition.

FIG. 4 also illustrates that during the given normal cycles and the post-defrost cycle, at most one cycle event occurs between each pair of cycle reset points 8. As a result, no fault conditions are detected.

DETECTION OF SHORT CYCLING CONDITION

In the course of monitoring the behavior of a compressor motor in a refrigeration unit, a condition known as short cycling may develop. Typically, a compressor motor will enter a short cycling condition when, for example, a condenser fan motor or machine room ventilation fan fails, a condenser becomes blocked, refrigerant is overcharged or lost, a pressure control is incorrectly set, an overloading or overheating of the compressor occurs, or a flow control device sticks or becomes fouled. The monitoring device according to the present invention detects the onset of a short cycling condition by detecting high current events 5 and keeping a count at memory location 118, shown in FIG. 1, and described above, of the number of such overloads within a particular period of motor run time, for example five minutes.

Figure 5:
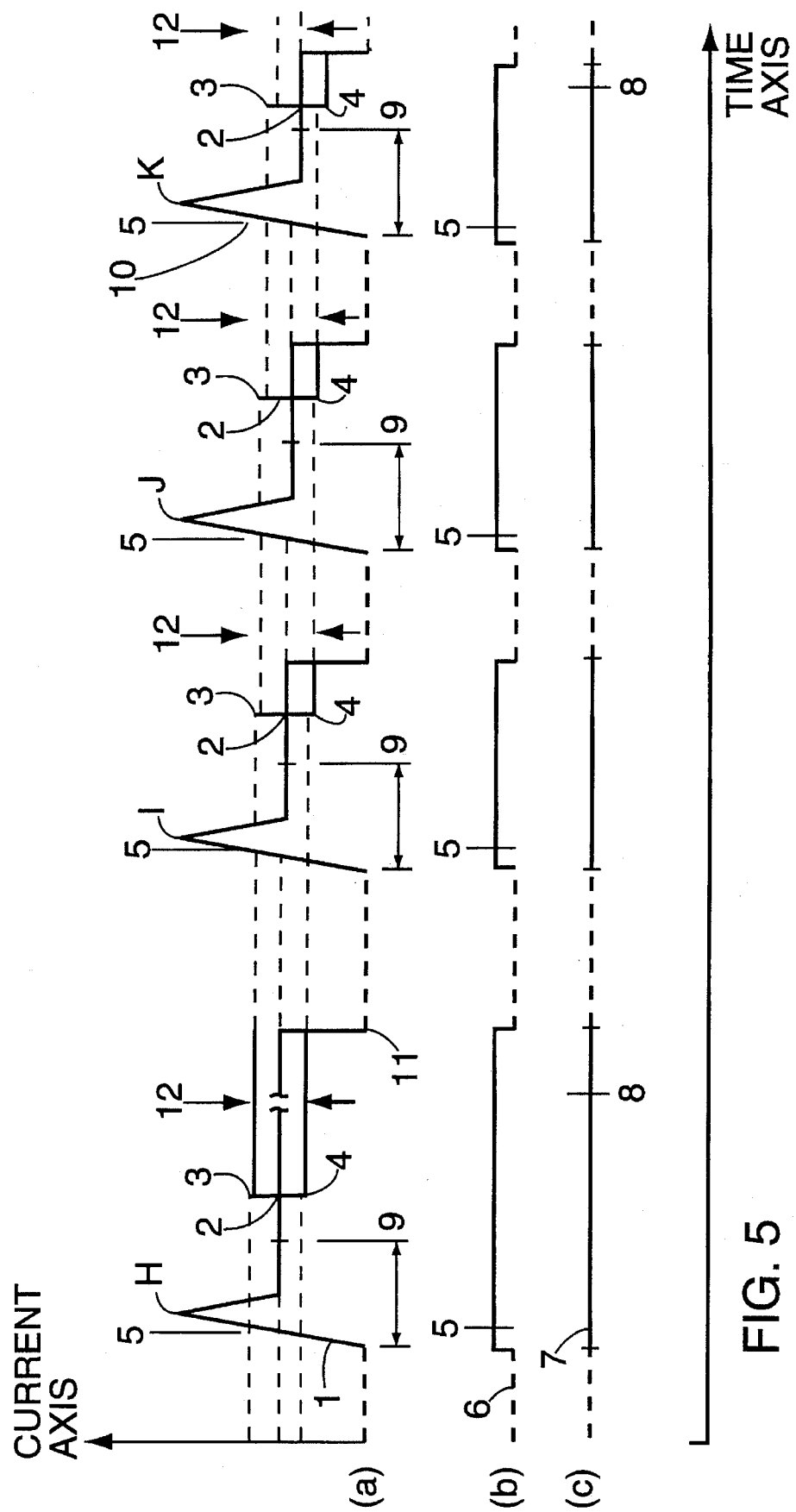
FIG. 5(a)–(c) shows three plots of a cycle timing diagram which illustrate the operation of the monitoring device of the present invention in detecting a short cycling condition.

Referring to FIG. 5, four cycles of the motor are depicted. The first of these cycles, H, is a normal cycle of sufficient duration that a cycle reset point 8 is reached in mid-cycle, flushing from memory 110 whatever cycle events (motor starts and overload events) had been recorded since the start of the accumulated run time 6. After the first cycle reset point 8, the normal cycle H continues for some time, and then turns off. During the time that the motor is off, the accumulated run time 6 is not incremented, but is held at the value it had reached between the cycle reset point 8 and the motor shut down 11.

When the motor restarts, at the beginning of cycle I, the incrementing of the accumulated run time resumes. Upon the measured current crossing the high current threshold 3, a high current event 5 is detected and the count of these events is set to one in memory location 118, shown in FIG. 1. Because the new current level is slightly lower than the previous level, a new stabilized current 2 is measured and a new high current threshold 3 and low current threshold 4 are computed and stored. As seen in FIG. 5, cycle I is of short duration; the motor cuts off long before the occurrence of the next cycle rest point 8. Consequently, incrementing of the accumulated run time is suspended.

After a brief down time, the motor is again powered-up as shown in FIG. 5 at cycle J. As the measured current rises above zero, incrementing of the accumulated run time 6 is resumed and the motor-on count 7 is incremented at memory location 117, shown in FIG. 1. As the motor accelerates, the measured current 1 rapidly rises and exceeds the high current threshold 3, which is now somewhat lower, having been adjusted at the previous cycle. When this occurs, a high current event 5 is detected and the count of high current events 5, stored in memory location 118, is set to two. When the current stabilizes, it does so at a level below the stabilized level for the previous cycle. The monitoring device detects this difference. In response, it measures a new stabilized current 2 and computes and stores new high and low current thresholds (3 and 4, respectively).

After a time, the motor again cuts off and the monitoring device suspends the incrementing of the accumulated run time 6. Up to this point, two current overloads of the motor (stored as high current events 5) have occurred within the preset cycle reset period 8. In general, the monitoring device of the present invention can be programmed so that the occurrence of a preselected number n of such events within a preselected cycle reset period 8 of time t will activate an alarm and a fault code. Accordingly, the device can, as shown, trigger an alarm in response to, for example, two current overloads within the cycle reset period of five minutes duration. As shown at the far right of FIG. 5, the cycle reset point 8 will occur sometime during the end of cycle K.

After another period of inactivity, the motor resumes operation. When the measured current 1 becomes positive, the incrementing of the accumulated run time 6 at memory location 116 (referring now also to FIG. 1) is resumed and the motor-on count 7 is incremented at memory location 117. The measured current 1 quickly surpasses the high current threshold 3, which had been readjusted to a lower level in the previous cycle and stored, and triggers the recording of the third high current event 5. As seen at the far right of FIG. 5, the cycle reset point 7 does not occur until somewhat later. Therefore, at this point, three starts of the motor in rapid succession within the cycle reset period 8.

As described above, the monitoring device of the present invention can be programmed so that the occurrence of n such events within a cycle reset period 8 of time t may respond by activating an alarm and/or shutting off the motor, in order to allow for proper diagnosis and correction of the malfunction. If so programmed, the monitoring device can optionally respond under the conditions shown in FIG. 5 up through the overload current of cycle K, that is three current overloads within a cycle reset period 8 of, for example, five minutes. The measured current 1 stabilizes, once again at a level lower than in the previous cycle. Thus, the monitoring device measures a new stabilized current 2 and computes and stores, respectively, in memory at locations 118 and 120 (shown in FIG. 1) the new high and low current thresholds 3 and 4, as discussed above.

DETECTION OF REPEATEDLY HIGH CURRENT

A repeatedly high current draw on a motor may indicate the presence of one of a set of fault conditions. In the context of a compressor motor for a refrigeration unit, the set of such fault conditions may include: (1) the returning of large amounts of liquid refrigerant or oil to the compressor, (2) the onset of seizing of bearings prior to lock up, (3) inadequate lubrication, or (4) intermittent voltage supply (contactor chatter). As is illustrated in FIGS. 6 and 7, the principles of the present invention may be used to detect and report this class of conditions.

Figure 6:
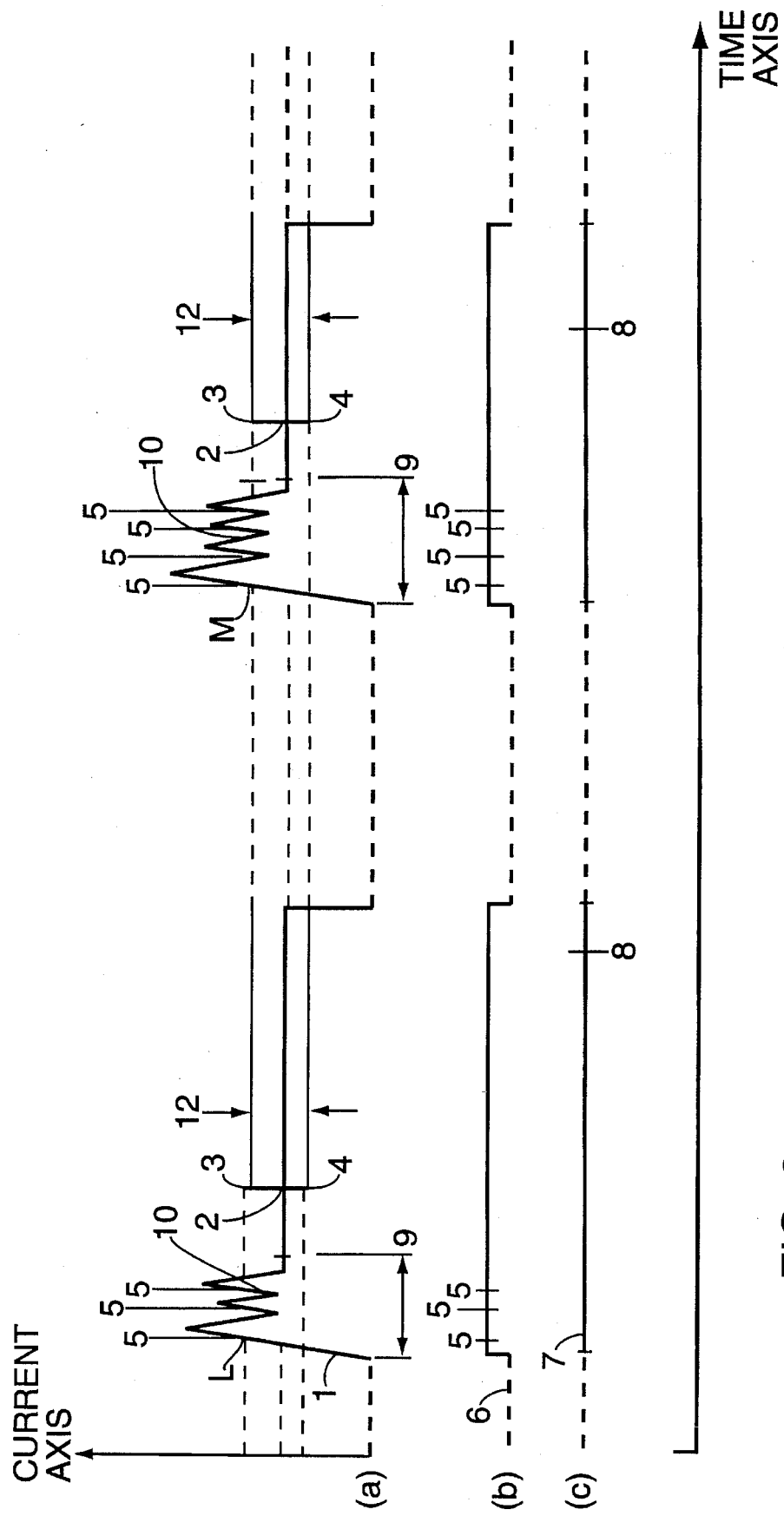
FIG. 6(a)–(c) shows three plots of a cycle timing diagram which illustrate the operation of the monitoring device of the present invention in detecting a repeatedly high current condition during the start-up of the motor.
Figure 7:
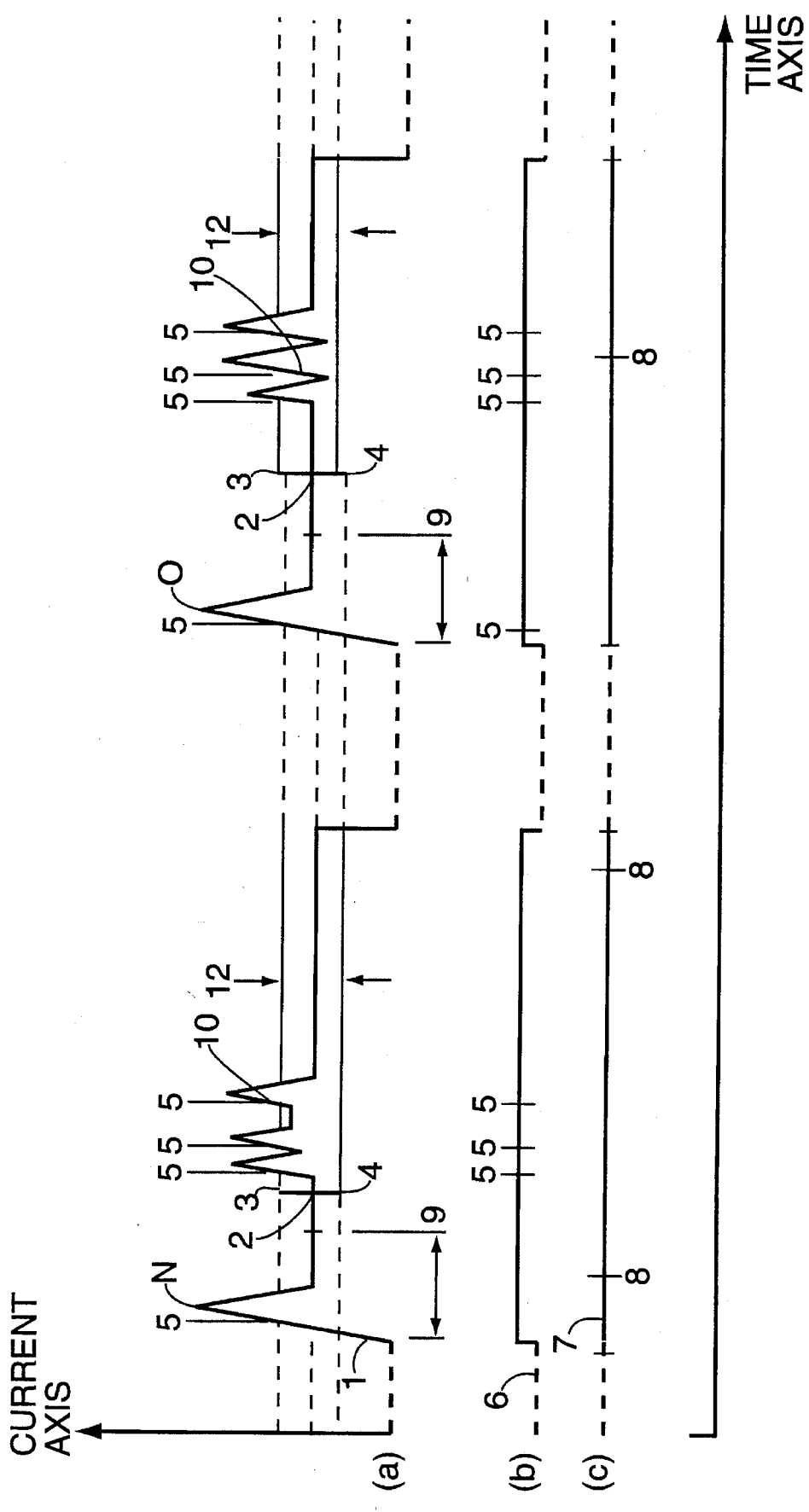
FIG. 7(a)–(c) shows three plots of a cycle timing diagram which illustrate the operation of the monitoring device of the present invention in detecting a repeatedly high current condition during the running of the motor.

FIG. 6 illustrates how the monitoring device detects and reports a repeatedly high current condition during the motor start-up. Two cycles are shown. In each cycle, the measured current 1 rises from zero as the motor powers up and begins its acceleration. As is the case even when the motor is functioning normally, the measured current 1 rapidly exceeds the high current threshold 3. Here, however, the measured current 1 does not thereafter smoothly settle to a stable level, but instead begins to oscillate, repeatedly crossing the high current threshold 3. Each time the measured current 1 crosses the high current threshold 3, a high current event 5 is stored in memory location 118, shown in FIG. 1.

Referring to the first cycle L in FIG. 6, toward the left side of plot (a), the measured current 1 rises from zero, which the monitoring device detects. In response thereto, the monitoring device starts incrementing the accumulated run time 6. The measured current 1 quickly hits three peaks, each of which leaves the normal range 12 by exceeding the high current threshold 3. On each crossing of the high current threshold 3, the count of high current events 5 is incremented by one at memory location 118, shown in FIG. 1. If the measured current 1 rises out of the normal range 12, for example, three times within a cycle reset period 8, the alarm display 10 is triggered as the measured current 1 exceeds the high current reference 3 for the third time. This event occurs well before the end of the cycle reset period 8.

After the end of the cycle reset period 8 is reached, the first cycle of the motor ends, and the accumulated run time 6 is suspended. Some time thereafter, the motor is reactivated. The monitoring device resumes incrementing the accumulated run time 6. As shown in FIG. 6, the motor again encounters a fault causing a repeated high current condition. In this second cycle, as shown toward the right side of plot (a) of FIG. 6, four consecutive current spikes occur before the cycle reset point 8 is reached. When the measured current has crossed the high current reference 3 for the third time, the alarm display 10 is activated.

Similar to FIG. 6, FIG. 7 shows how the monitoring device detects a repeated current overload condition. In this Figure, however, the repeatedly high current condition occurs not during start-up but rather during run-time. A repeatedly high current condition is shown in FIG. 7 for both of the two cycles, which appear as a set of spikes in the measured current 1 signal that occur after the measured current 1 has stabilized at its steady state condition.

In the first cycle, N, shown towards the left side of FIG. 7, a cycle reset point 8 happens to occur at about the same time that the motor start up has finished, which prompts the monitoring device to set the accumulated run time 6 stored at memory location 116, the motor-on count 7 stored at memory location 117 and the high current event 5 count stored at memory location 118 to zero. Because the current is, at this time, above zero, the monitoring device instantaneously begins incrementing the accumulated run time 6 at memory location 116.

After the motor has run for some time in an apparently normal mode, a series of spikes again appears in the measured current 1, each of which exceeds the high current reference 3. As explained above, each time that the current rises above the high current reference, the monitoring device counts a high current event 5. These are the first overload events to occur after the most recent cycle reset point 8. Because in the present embodiment three high current events may be assumed to be sufficient to signify the existence of a fault, when the measured current 1 surpasses the high current reference point 8 for the third time, the alarm display 10 is activated.

DETECTION OF SUSTAINED HIGH CURRENT

A sustained high motor current may be symptomatic of the presence of one of a class of motor fault conditions. In the context of a refrigerator compressor motor, such fault conditions include: (1) single phasing, (2) starter contact failure, (3) rotor or stator problems, such as dead spots in windings, (4) extreme motor overloading, (5) low voltage conditions, (6) faulty starting components (e.g., relays, capacitors) and (7) loose electrical connections.

Figure 8:
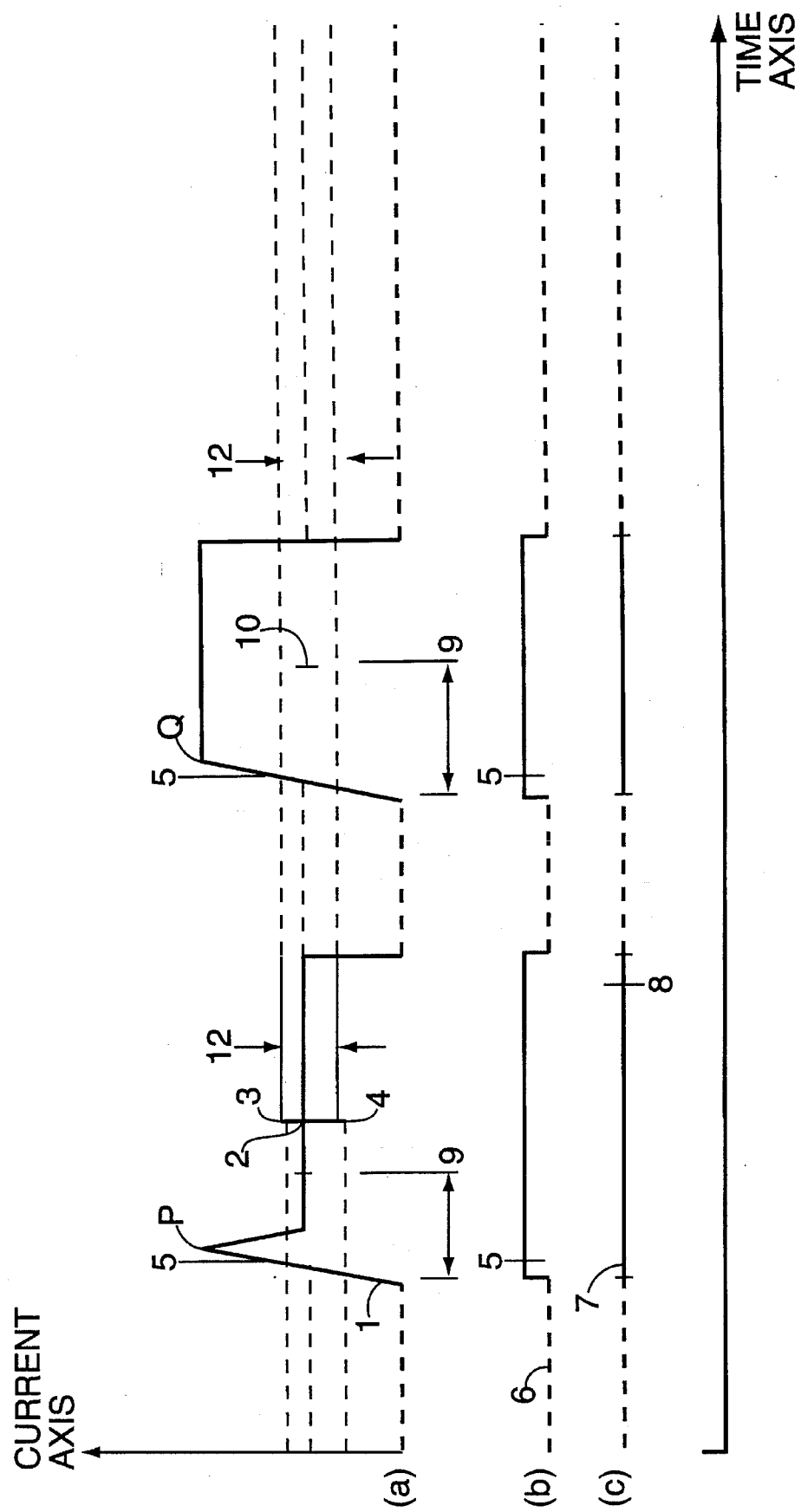
FIG. 8(a)–(c) shows three plots of a cycle timing diagram which illustrate the operation of the monitoring device of the present invention in detecting a sustained high current condition occurring on motor start-up.

FIG. 8 depicts an example of a sustained high current occurring at start-up and stabilization. Two cycles are shown. The first cycle P is a normal cycle and illustrates a current settling at a higher stabilized current 2 than in the previous cycle. The high and low current reference points, computed as a function of the new stabilized current 2, are accordingly adjusted upward to reflect the higher current regime that the motor has just entered. While the current remains stable, the cycle reset point 8 is reached, which prompts the monitoring device to reset all counters to zero. For a time, the motor is turned off. After the motor is again turned on, the monitoring device begins incrementing the accumulated run time 6. The measured current 1 rises rapidly, as expected during the motor acceleration, and soon peaks out of the normal range 12, registering a high current event 5. Now, however, abnormal behavior is encountered. Rather than quickly stabilize at a normal level below the high current reference 3, the measured current 1 remains at peak amplitude. The monitoring device measures the duration of the sustained high measured current 1. If the measured current remains outside the normal range 12 (set in the last normal cycle) until, for example, five seconds of accumulated run time has been logged, an alarm display 10 is activated.

Figure 9:
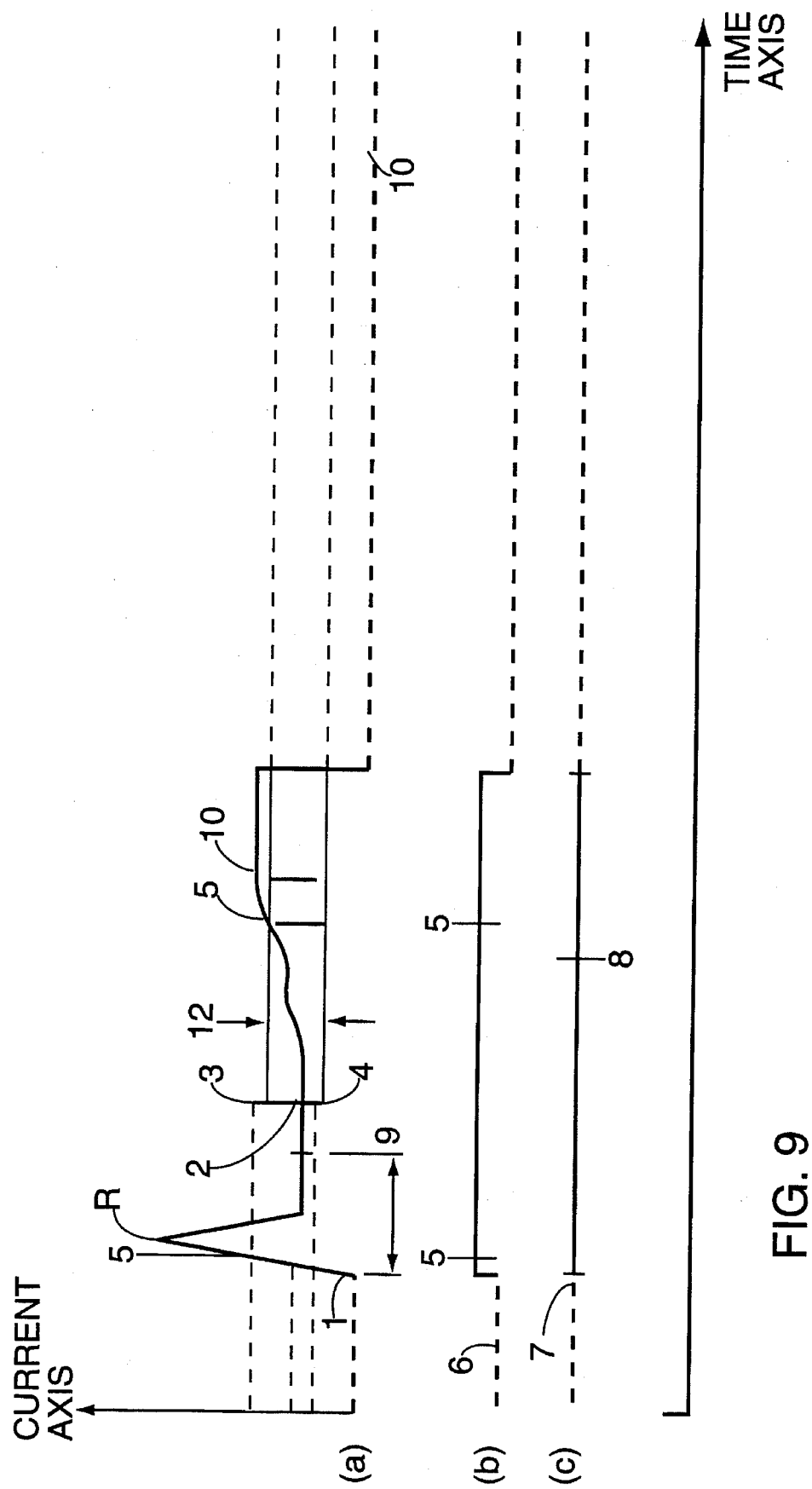
FIG. 9(a)–(c) shows three plots of a cycle timing diagram which illustrate the operation of the monitoring device of the present invention in detecting a sustained high current condition during the running of the motor.

A case of sustained high current can also beset a motor once it has been running for some time. The current may drift out of the normal range 12 and remain there. This phenomenon is illustrated in FIG. 9. As shown therein, the measured current 1 initially responds normally to the activation of the motor. Once the measured current 1 rises above zero, the monitoring begins measuring the accumulated run time 6. The current rapidly climbs and crosses the high current reference 3 set in the previous cycle. After peaking outside the normal range 12, the measured current 1 settles out at a stabilized current 2, this time at a level below the previous stabilized current. The monitoring device detects this decline and resets the normal range 12, by way of the high and low current thresholds 3 and 4, respectively. Eventually, the measured current 1 begins to drift slowly upward. While the current 1 is still within the normal range 12 (below the new value of the high current reference 3) the cycle reset point 7 is reached, whereupon the monitoring device clears the accumulated run time 6 memory location 116 (shown in FIG. 1) and the motor-on count 7 at memory location 117. The measured current 1 continues its upward drift and crosses the high current threshold 3, triggering a high current event 5. If this high current condition persists for two seconds, for example, the monitoring device indicates this by activating the appropriate alarm display 10, as shown in plot (a) of FIG. 9.

DETECTION OF LOSS OF MECHANICAL PERFORMANCE

In the running of a motor, particularly a refrigerator compressor motor, a loss of mechanical performance may be detected by monitoring the measured current. Such a loss of performance could be attributed to, for example, a broken rod or crankshaft, the failure of a valve plate, extreme changes in the ambient temperature, partially restricted flow control devices, or the loss of refrigerant.

Figure 10:
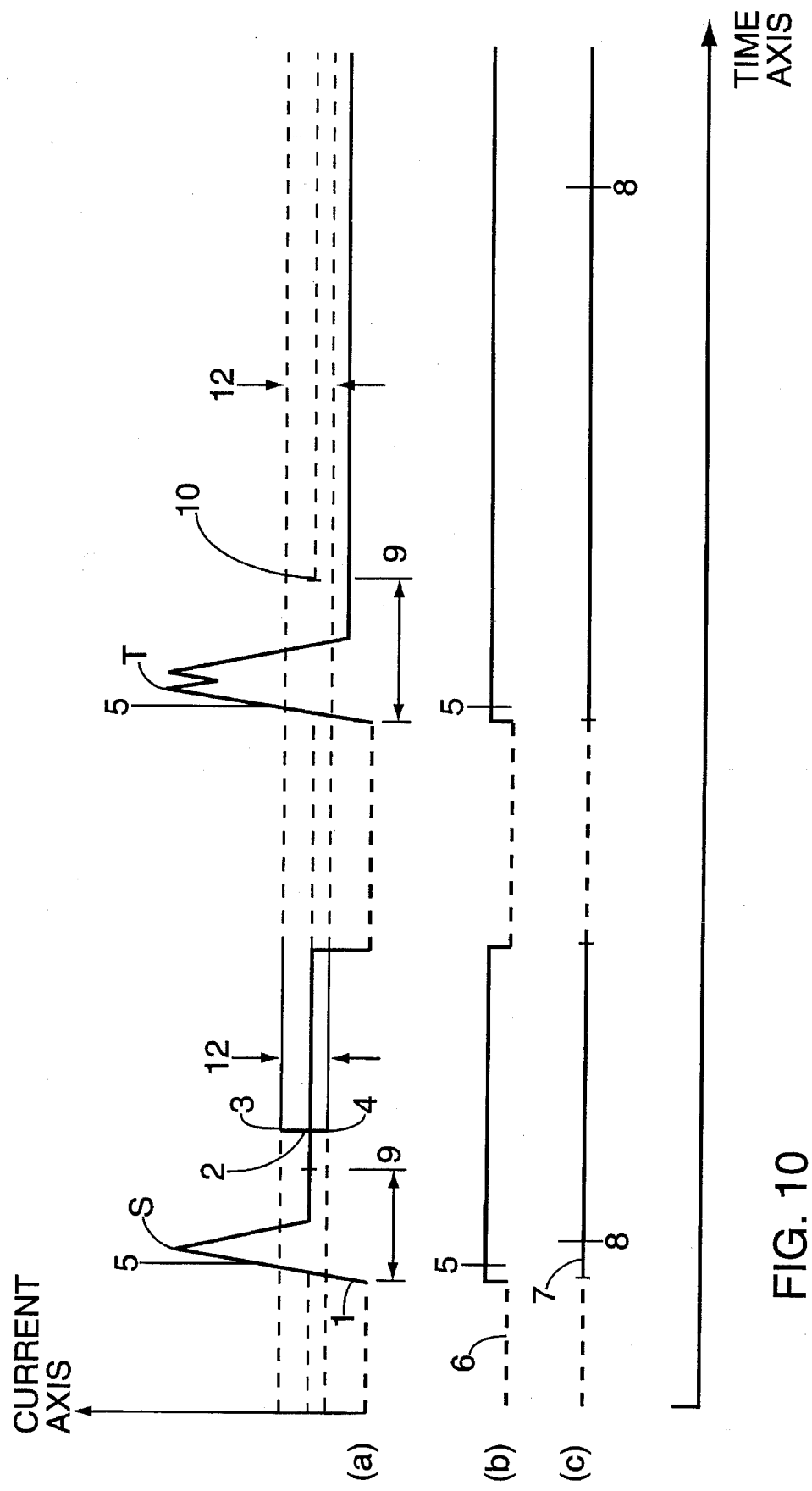
FIG. 10(a)–(c) shows three plots of a cycle timing diagram which illustrate the operation of the monitoring device of the present invention in detecting a loss of mechanical performance during motor start-up.

An example of measured current 1 and monitoring device response to a loss of mechanical performance is shown in FIG. 10. The graph depicts two run cycles. The first of these, cycle S, represents a normal cycle, of the sort discussed several times above. Note that the stabilized current after power-up is identical to the threshold set point from the previous cycle; this eliminates the need to update the high current and low current thresholds 3 and 4, respectively.

The second of these cycles T illustrates a loss of mechanical capacity. After the completion of cycle S, the motor remains off for a period time before being reactivated. When it is again turned on, the monitoring device recommences incrementing the accumulated run time 6. When the measured current 1 exceeds the high current threshold 3, this event is duly noted by the monitoring device as a high current event 5. After reaching a peak, the measured current very briefly drops, although not below the high current threshold, and then rises once again, indicating the possible presence of a massive overload condition. Thereafter, the current 1 falls far below the normal range 12, whose lower bound is the low current threshold 4 derived in a previous cycle. The monitoring device will check whether this low current condition persists throughout the five second acceleration period. If it does, the monitoring device will active the appropriate alarm display.

Figure 11:
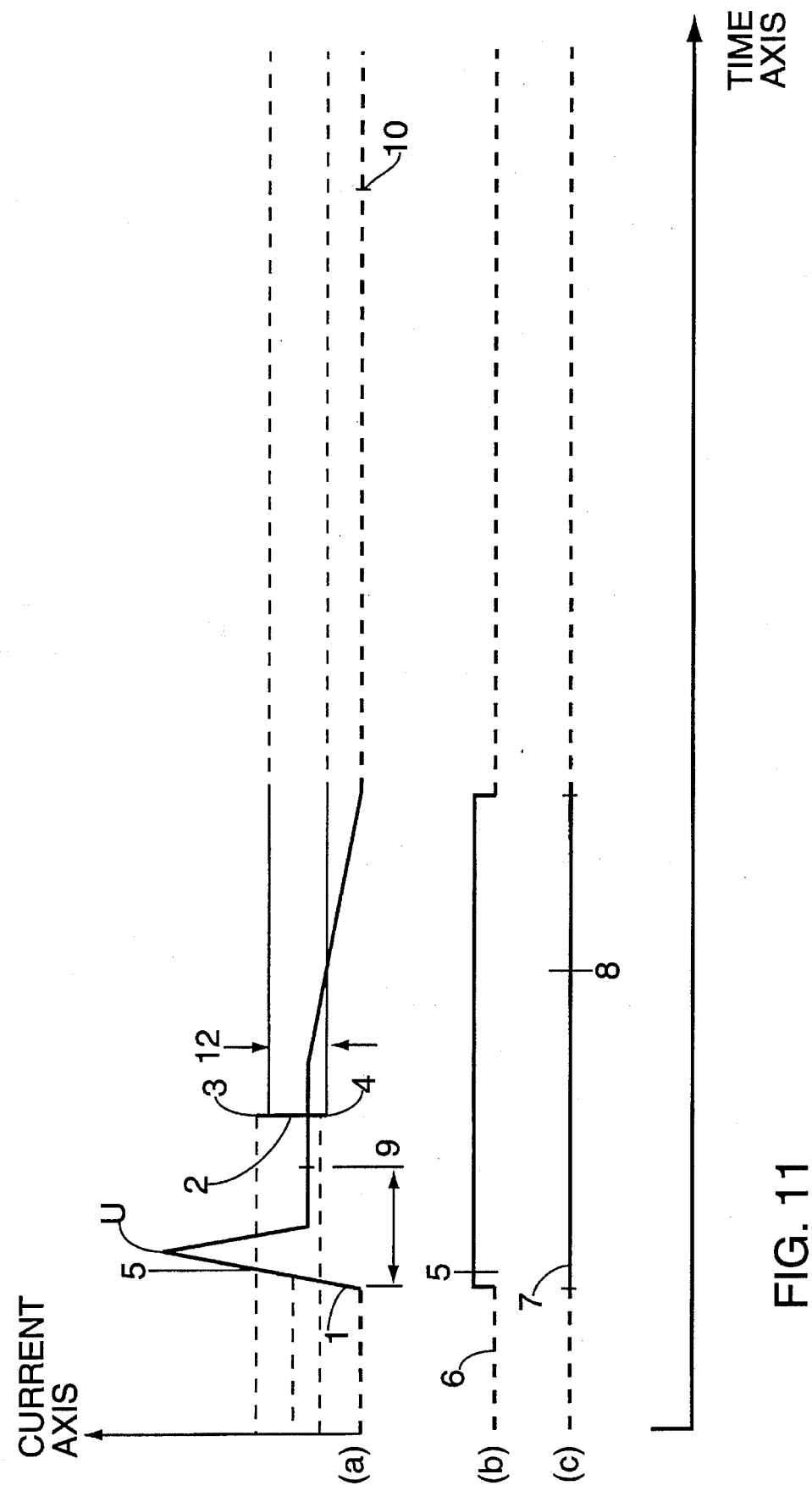
FIG. 11(a)–(c) shows three plots of a cycle timing diagram which illustrate the operation of the monitoring device of the present invention in detecting a loss of mechanical performance during the running of the motor.

A loss of mechanical performance may also occur after the motor has been running for some time. This condition, which may take effect gradually (known as a "maintained load loss") or suddenly (upon the failure of a component or control circuit of the monitored system), is illustrated in FIG. 11 as a gradually occurring maintained load loss. At some time after the measured current 1 has stabilized at 2 (here at a level lower than the previous stabilized current, necessitating the computation and storage of updated high and low current threshold points 3 and 4, respectively), the current 1 enters a gradual decline. A cycle reset point 8 occurs, triggering the monitoring device to flush all counters. Shortly thereafter, the current 1 crosses below the newly updated low current threshold 4. At this point the monitoring device begins to measure the elapsed time since the current fell short of the low current threshold 4. The measured current 1 continues to decline until it reaches zero, where it then remains. The monitoring device measures the elapsed time since the motor has been off and stores this measurement at memory location 130 (shown in FIG. 1 as "time since motor off"). Once the monitoring device has discerned that the time the motor has been off exceeds a certain preselected value (which can be adjusted to accommodate different monitored systems), the monitoring device activates an alarm display 10.

Figure 12:
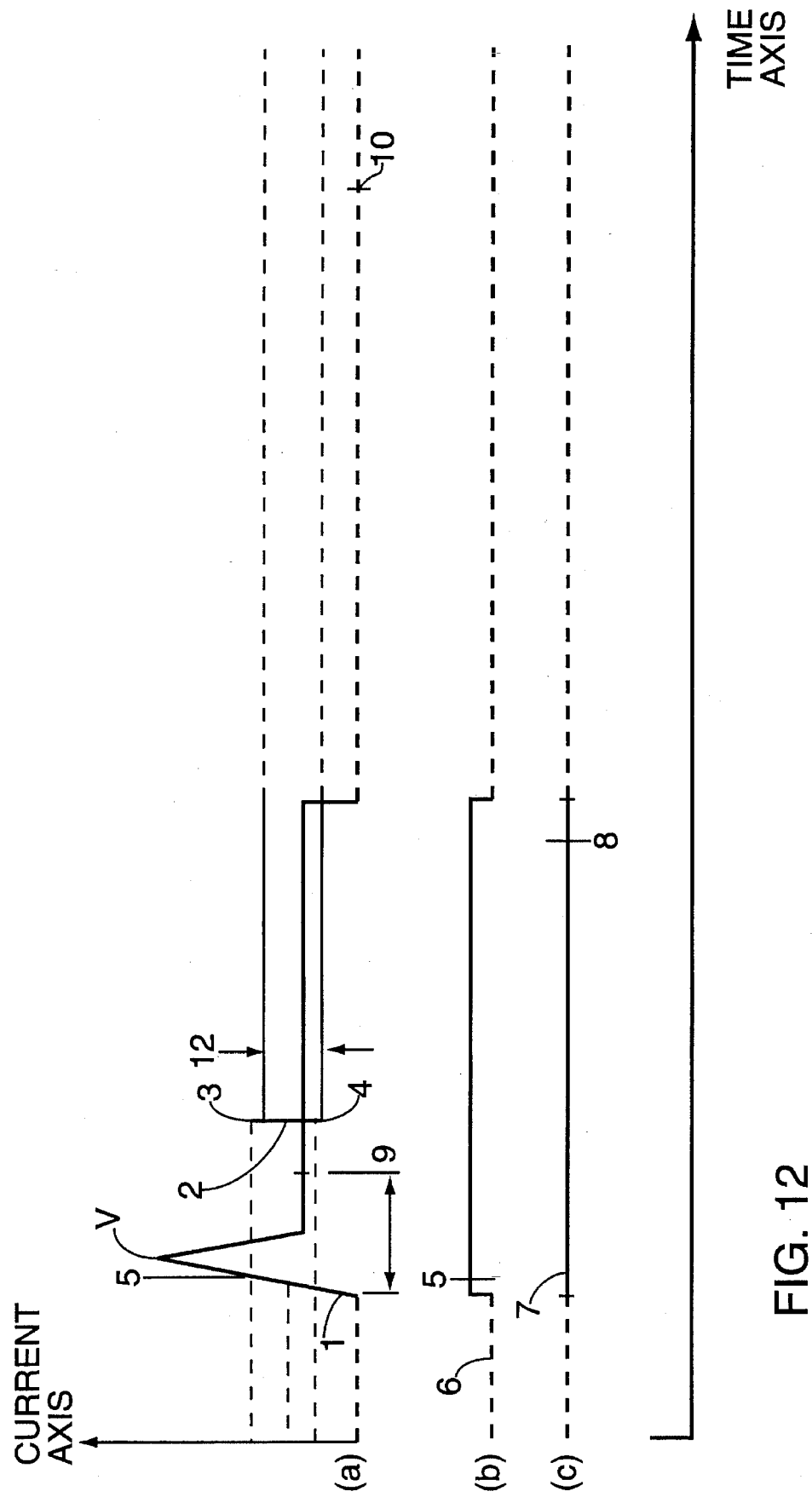
FIG. 12(a)–(c) shows three plots of a cycle timing diagram which illustrate the operation of the monitoring device of the present invention in detecting a sudden load loss due to control circuit or component failure.
Figure 13:
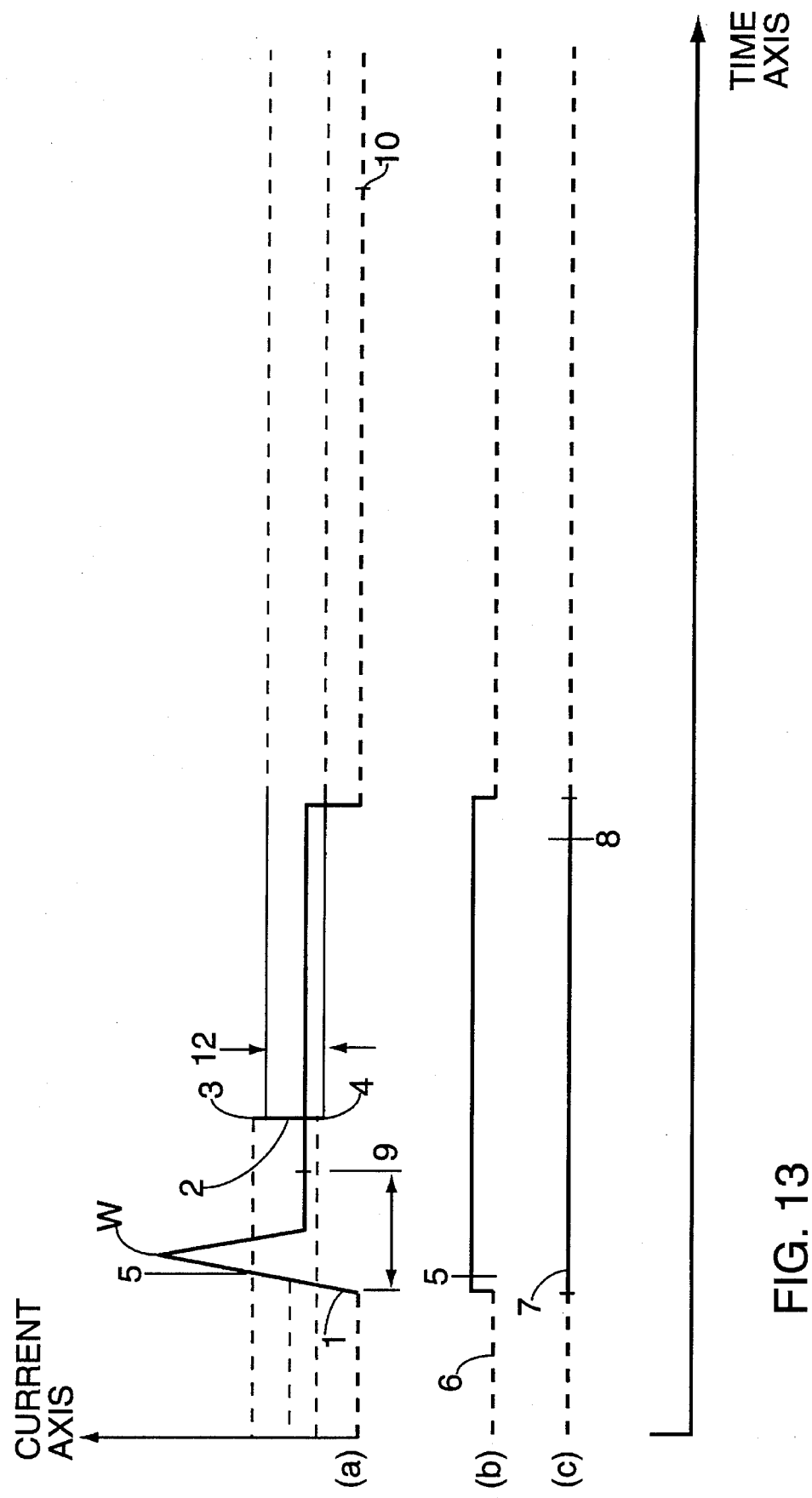
FIG. 13(a)–(c) shows three plots of a cycle timing diagram which illustrate the operation of the monitoring device of the present invention in detecting a sudden load loss due to defrost circuit component failure.

As mentioned above, sustained low current conditions at run time can also occur precipitously. FIGS. 12 and 13 illustrate two examples of this kind of sudden load loss, in the context of a refrigeration unit, due to control circuit or component failure and to defrost circuit component failure, respectively. The events shown in FIGS. 12 and 13 are identical to those described above in connection with FIG. 11 and differ only in the mode of current drop-off, which is sudden rather than gradual.

What is claimed is:

1. A method of monitoring the operation of a motor-driven system, comprising the steps of:

sensing a current drawn by the motor at a preselected time after starting the motor;

comparing the sensed current to previously determined minimum and maximum current threshold values which define a range of currents;

determining that a malfunction has occurred in the system when the current is sensed outside the range of currents;

adjusting at least one of the minimum and maximum current threshold values as a function of the sensed current; and storing the adjusted threshold values to be used the next time the preceding steps are carried out.

2. The method according to claim 1, wherein the step of determining that a malfunction has occurred includes the steps of:

counting a number of times that the current transitions outside of the range of currents during a preselected period of time; and comparing the count to a preselected number, wherein it is determined that a malfunction has occurred if the count is greater than the preselected number.

3. The method according to claim 1, wherein the step of determining that a malfunction has occurred includes the steps of:

measuring an amount of time during which the current is sensed outside of the range of currents; and comparing the measured amount of time to a preselected amount of time, wherein it is determined that a malfunction has occurred if the measured amount of time is greater than the preselected amount of time.

4. The method according to claim 1, further comprising the step of indicating that a malfunction has occurred in the motor when the current is sensed outside the range of currents.

5. A device for monitoring the operation of a motor-driven system, comprising:

means for sensing a current drawn by the motor at a preselected time after starting the motor;

means for comparing the sensed current to previously determined minimum and maximum current threshold values which define a range of currents;

means for determining that a malfunction has occurred in the system when the current is sensed outside the range of currents;

means for adjusting at least one of the minimum and maximum current threshold values as a function of the sensed current; and means for storing the adjusted threshold values for subsequent use.

6. The device according to claim 5, wherein the means for determining that a malfunction has occurred includes:

means for counting a number of times that the current transitions outside the range of currents during a preselected period of time; and means for comparing the count to a preselected number, wherein the means for determining that a malfunction has occurred determines that a malfunction has occurred if the count is greater than the preselected number.

7. The device according to claim 5, wherein the means for determining that a malfunction has occurred includes:

means for measuring an amount of time during which the current is sensed outside of the range of currents; and means for comparing the measured amount of time to a preselected amount of time, wherein the means for determining that a malfunction has occurred determines that a malfunction has occurred if the measured amount of time is greater than the preselected amount of time.

8. The device according to claim 5, further comprising means for indicating that a malfunction has occurred in the motor when the current is sensed outside the range of currents.

9. A method of monitoring the operation of a motor-driven system, comprising the steps of:

sensing a current drawn by the motor;

comparing the sensed current to a previously determined minimum current threshold value;

timing an interval during which the sensed current is below the minimum current threshold value;

comparing the interval to a preselected maximum time threshold value;

determining that a malfunction has occurred in the system if the interval is greater than the preselected maximum time threshold value; adjusting the minimum current threshold value as a function of the sensed current; and storing the adjusted minimum current threshold value to be used the next time the preceding steps are carried out.

10. A method of monitoring the operation of a motor-driven system, comprising the steps of:

sensing a peak current drawn by the motor;

comparing the sensed peak current to a previously determined maximum current threshold value;

counting a number of times that the peak current transitions above the maximum current threshold value within a preselected interval of time;

comparing the count to a preselected maximum count threshold value;

determining that a malfunction has occurred in the system if the count is greater than the preselected maximum count threshold value; adjusting the maximum current threshold value as a function of the sensed current; and storing the adjusted maximum current threshold value to be used the next time the preceding steps are carried out.

11. The method according to claim 10, wherein the preselected interval of time is 5 minutes and the preselected maximum count threshold value is 3.

* * * * *